United States Patent
Zien

(10) Patent No.: US 11,712,627 B2
(45) Date of Patent: Aug. 1, 2023

(54) SYSTEM AND METHOD FOR PROVIDING CONDITIONAL ACCESS TO VIRTUAL GAMING ITEMS

(71) Applicant: Activision Publishing, Inc., Santa Monica, CA (US)

(72) Inventor: Brandon Myles Zien, Sherman Oaks, CA (US)

(73) Assignee: Activision Publishing, Inc., Santa Monica, CA (US)

( * ) Notice: Subject to any disclaimer, the term of this patent is extended or adjusted under 35 U.S.C. 154(b) by 0 days.

(21) Appl. No.: 17/086,594

(22) Filed: Nov. 2, 2020

(65) Prior Publication Data

US 2021/0138349 A1 May 13, 2021

Related U.S. Application Data

(60) Provisional application No. 62/933,209, filed on Nov. 8, 2019.

(51) Int. Cl.
  *A63F 13/73* (2014.01)
  *A63F 13/69* (2014.01)
  (Continued)

(52) U.S. Cl.
  CPC ............ *A63F 13/73* (2014.09); *A63F 13/533* (2014.09); *A63F 13/69* (2014.09); *A63F 13/80* (2014.09);
  (Continued)

(58) Field of Classification Search
  CPC ...... G06Q 50/01; G06Q 20/145; G06N 3/006; A63F 2300/575; A63F 2300/5553;
  (Continued)

(56) References Cited

U.S. PATENT DOCUMENTS 4,461,301 A 7/1984 Ochs
4,908,761 A 3/1990 Tai
(Continued)

FOREIGN PATENT DOCUMENTS

AU 768367 3/2004
AU 2005215048 10/2011
(Continued)

OTHER PUBLICATIONS

"World of Warcraft." Wikipedia. Accessed Aug. 23, 2022. <https://en.wikipedia.org/wiki/World_of_Warcraft> (Year: 2022).*
(Continued)

*Primary Examiner* — William H McCulloch, Jr.
(74) *Attorney, Agent, or Firm* — Novel IP

(57) ABSTRACT

The present specification describes a system and method for providing conditional access to a virtual gaming item possessed by a first player of a video game to a second player. The method includes: creating a database of conditionally accessible virtual items, wherein said accessibility is determined based on at least one predefined condition; modifying an attribute of the virtual item for making the second player aware that said item is available for conditional access for a predefined period of time; fulfilling, by the second player, at least one access condition; and providing accessibility to the item to the second player for the predefined period of time.

20 Claims, 16 Drawing Sheets

(51) Int. Cl.
  *A63F 13/533* (2014.01)
  *A63F 13/80* (2014.01)
(52) U.S. Cl.
  CPC . *A63F 2300/5533* (2013.01); *A63F 2300/575* (2013.01); *A63F 2300/638* (2013.01)
(58) Field of Classification Search
  CPC ........ A63F 13/75; A63F 13/822; A63F 13/69; A63F 13/73
  See application file for complete search history.

(56) References Cited

U.S. PATENT DOCUMENTS

| | | |
|---|---|---|
| 5,031,089 A | 7/1991 | Liu |
| 5,058,180 A | 10/1991 | Khan |
| 5,365,360 A | 11/1994 | Torres |
| 5,371,673 A | 12/1994 | Fan |
| 5,432,934 A | 7/1995 | Levin |
| 5,442,569 A | 8/1995 | Osano |
| 5,442,780 A | 8/1995 | Takanashi |
| 5,493,692 A | 2/1996 | Theimer |
| 5,497,186 A | 3/1996 | Kawasaki |
| 5,506,902 A | 4/1996 | Kubota |
| 5,530,796 A | 6/1996 | Wang |
| 5,539,883 A | 7/1996 | Allon |
| 5,561,736 A | 10/1996 | Moore |
| 5,563,946 A | 10/1996 | Cooper |
| 5,606,702 A | 2/1997 | Diel |
| 5,630,129 A | 5/1997 | Wheat |
| 5,685,775 A | 11/1997 | Bakoglu |
| 5,694,616 A | 12/1997 | Johnson |
| 5,706,507 A | 1/1998 | Schloss |
| 5,708,764 A | 1/1998 | Borrel |
| 5,726,883 A | 3/1998 | Levine |
| 5,734,898 A | 3/1998 | He |
| 5,736,985 A | 4/1998 | Lection |
| 5,736,990 A | 4/1998 | Barrus |
| 5,737,416 A | 4/1998 | Cooper |
| 5,737,533 A | 4/1998 | De |
| 5,745,113 A | 4/1998 | Jordan |
| 5,745,678 A | 4/1998 | Herzberg |
| 5,758,079 A | 5/1998 | Ludwig |
| 5,761,083 A | 6/1998 | Brown |
| 5,762,552 A | 6/1998 | Vuong |
| 5,768,511 A | 6/1998 | Galvin |
| 5,774,668 A | 6/1998 | Choquier |
| 5,793,365 A | 8/1998 | Tang |
| 5,825,877 A | 10/1998 | Dan |
| 5,828,839 A | 10/1998 | Moncreiff |
| 5,835,094 A | 11/1998 | Ermel |
| 5,835,692 A | 11/1998 | Cragun |
| 5,860,137 A | 1/1999 | Raz |
| 5,877,763 A | 3/1999 | Berry |
| 5,878,233 A | 3/1999 | Schloss |
| 5,880,731 A | 3/1999 | Liles |
| 5,883,628 A | 3/1999 | Mullaly |
| 5,900,879 A | 5/1999 | Berry |
| 5,903,266 A | 5/1999 | Berstis |
| 5,903,271 A | 5/1999 | Bardon |
| 5,911,045 A | 6/1999 | Leyba |
| 5,920,325 A | 7/1999 | Morgan |
| 5,920,692 A | 7/1999 | Nguyen |
| 5,920,848 A | 7/1999 | Schutzer |
| 5,923,324 A | 7/1999 | Berry |
| 5,926,100 A | 7/1999 | Escolar |
| 5,933,818 A | 8/1999 | Kasravi |
| 5,933,849 A | 8/1999 | Srbljic |
| 5,938,722 A | 8/1999 | Johnson |
| 5,958,014 A | 9/1999 | Cave |
| 5,969,724 A | 10/1999 | Berry |
| 5,977,979 A | 11/1999 | Clough |
| 5,983,003 A | 11/1999 | Lection |
| 5,990,887 A | 11/1999 | Redpath |
| 5,990,888 A | 11/1999 | Blades |
| 6,006,034 A | 12/1999 | Heath |
| 6,006,223 A | 12/1999 | Agrawal |
| 6,008,848 A | 12/1999 | Tiwari |
| 6,009,455 A | 12/1999 | Doyle |
| 6,009,458 A | 12/1999 | Hawkins |
| 6,012,096 A | 1/2000 | Link |
| 6,014,145 A | 1/2000 | Bardon |
| 6,018,734 A | 1/2000 | Zhang |
| 6,021,268 A | 2/2000 | Johnson |
| 6,021,496 A | 2/2000 | Dutcher |
| 6,023,729 A | 2/2000 | Samuel |
| 6,025,839 A | 2/2000 | Schell |
| 6,032,129 A | 2/2000 | Greef |
| 6,049,819 A | 4/2000 | Buckle |
| 6,058,266 A | 5/2000 | Megiddo |
| 6,059,842 A | 5/2000 | Dumarot |
| 6,061,722 A | 5/2000 | Lipa |
| 6,067,355 A | 5/2000 | Lim |
| 6,069,632 A | 5/2000 | Mullaly |
| 6,070,143 A | 5/2000 | Barney |
| 6,076,093 A | 6/2000 | Pickering |
| 6,081,270 A | 6/2000 | Berry |
| 6,081,271 A | 6/2000 | Bardon |
| 6,088,727 A | 7/2000 | Hosokawa |
| 6,088,732 A | 7/2000 | Smith |
| 6,091,410 A | 7/2000 | Lection |
| 6,094,196 A | 7/2000 | Berry |
| 6,098,056 A | 8/2000 | Rusnak |
| 6,098,093 A | 8/2000 | Bayeh |
| 6,101,538 A | 8/2000 | Brown |
| 6,104,406 A | 8/2000 | Berry |
| 6,105,008 A | 8/2000 | Davis |
| 6,108,420 A | 8/2000 | Larose |
| 6,111,581 A | 8/2000 | Berry |
| 6,115,718 A | 9/2000 | Huberman |
| 6,119,229 A | 9/2000 | Martinez |
| 6,134,588 A | 10/2000 | Guenthner |
| 6,135,646 A | 10/2000 | Kahn |
| 6,138,128 A | 10/2000 | Perkowitz |
| 6,138,152 A | 10/2000 | Jalote |
| 6,141,699 A | 10/2000 | Luzzi |
| 6,144,381 A | 11/2000 | Lection |
| 6,148,294 A | 11/2000 | Beyda |
| 6,148,299 A | 11/2000 | Yoshimoto |
| 6,148,328 A | 11/2000 | Cuomo |
| 6,154,811 A | 11/2000 | Srbljic |
| 6,157,953 A | 12/2000 | Chang |
| 6,170,013 B1 | 1/2001 | Murata |
| 6,177,932 B1 | 1/2001 | Galdes |
| 6,179,713 B1 | 1/2001 | James |
| 6,182,067 B1 | 1/2001 | Presnell |
| 6,182,077 B1 | 1/2001 | Tokumine |
| 6,185,614 B1 | 2/2001 | Cuomo |
| 6,195,657 B1 | 2/2001 | Rucker |
| 6,199,059 B1 | 3/2001 | Dahan |
| 6,199,067 B1 | 3/2001 | Geller |
| 6,201,881 B1 | 3/2001 | Masuda |
| 6,205,481 B1 | 3/2001 | Heddaya |
| 6,212,494 B1 | 4/2001 | Boguraev |
| 6,212,548 B1 | 4/2001 | Desimone |
| 6,216,098 B1 | 4/2001 | Clancey |
| 6,219,675 B1 | 4/2001 | Pal |
| 6,219,676 B1 | 4/2001 | Reiner |
| 6,222,551 B1 | 4/2001 | Schneider |
| 6,226,686 B1 | 5/2001 | Rothschild |
| 6,233,583 B1 | 5/2001 | Hoth |
| 6,249,779 B1 | 6/2001 | Hitt |
| 6,266,649 B1 | 7/2001 | Linden |
| 6,270,416 B1 | 8/2001 | Komoto |
| 6,271,842 B1 | 8/2001 | Bardon |
| 6,271,843 B1 | 8/2001 | Lection |
| 6,275,820 B1 | 8/2001 | Navin-Chandra |
| 6,282,547 B1 | 8/2001 | Hirsch |
| 6,292,835 B1 | 9/2001 | Huang |
| 6,293,865 B1 | 9/2001 | Kelly |
| 6,301,609 B1 | 10/2001 | Aravamudan et al. |
| 6,308,208 B1 | 10/2001 | Jung |
| 6,311,206 B1 | 10/2001 | Malkin |
| 6,314,465 B1 | 11/2001 | Paul |
| 6,321,236 B1 | 11/2001 | Zollinger |

(56) References Cited

U.S. PATENT DOCUMENTS

| | | |
|---|---|---|
| 6,330,281 B1 | 12/2001 | Mann |
| 6,334,127 B1 | 12/2001 | Bieganski |
| 6,334,141 B1 | 12/2001 | Varma |
| 6,336,134 B1 | 1/2002 | Varma |
| 6,337,700 B1 | 1/2002 | Kinoe |
| 6,343,738 B1 | 2/2002 | Ogilvie |
| 6,345,264 B1 | 2/2002 | Breese |
| 6,345,287 B1 | 2/2002 | Fong |
| 6,349,091 B1 | 2/2002 | Li |
| 6,351,775 B1 | 2/2002 | Yu |
| 6,353,449 B1 | 3/2002 | Gregg |
| 6,356,297 B1 | 3/2002 | Cheng |
| 6,360,254 B1 | 3/2002 | Linden |
| 6,363,174 B1 | 3/2002 | Lu |
| 6,366,285 B1 | 4/2002 | Brush |
| 6,370,560 B1 | 4/2002 | Robertazzi |
| 6,396,513 B1 | 5/2002 | Helfman |
| 6,397,080 B1 | 5/2002 | Viktorsson |
| 6,404,426 B1 | 6/2002 | Weaver |
| 6,411,312 B1 | 6/2002 | Sheppard |
| 6,418,424 B1 | 7/2002 | Hoffberg |
| 6,418,462 B1 | 7/2002 | Xu |
| 6,421,047 B1 | 7/2002 | De |
| 6,426,757 B1 | 7/2002 | Smith |
| 6,445,389 B1 | 9/2002 | Bossen |
| 6,449,518 B1 | 9/2002 | Yokoo |
| 6,452,593 B1 | 9/2002 | Challener |
| 6,462,760 B1 | 10/2002 | Cox, Jr. |
| 6,463,078 B1 | 10/2002 | Engstrom |
| 6,466,550 B1 | 10/2002 | Foster |
| 6,469,712 B1 | 10/2002 | Hilpert, Jr. |
| 6,473,085 B1 | 10/2002 | Brock |
| 6,473,103 B1 | 10/2002 | Bailey |
| 6,473,597 B1 | 10/2002 | Johnson |
| 6,476,830 B1 | 11/2002 | Farmer |
| 6,499,053 B1 | 12/2002 | Marquette |
| 6,501,834 B1 | 12/2002 | Milewski |
| 6,505,208 B1 | 1/2003 | Kanevsky |
| 6,509,925 B1 | 1/2003 | Dermler |
| 6,525,731 B1 | 2/2003 | Suits |
| 6,539,415 B1 | 3/2003 | Mercs |
| 6,549,933 B1 | 4/2003 | Barrett |
| 6,559,863 B1 | 5/2003 | Megiddo |
| 6,567,109 B1 | 5/2003 | Todd |
| 6,567,813 B1 | 5/2003 | Zhu |
| 6,574,477 B1 | 6/2003 | Rathunde |
| 6,580,981 B1 | 6/2003 | Masood |
| 6,591,250 B1 | 7/2003 | Johnson |
| 6,594,673 B1 | 7/2003 | Smith |
| 6,601,084 B1 | 7/2003 | Bhaskaran |
| 6,618,751 B1 | 9/2003 | Challenger |
| 6,640,230 B1 | 10/2003 | Alexander |
| 6,641,481 B1 | 11/2003 | Mai |
| 6,645,153 B2 | 11/2003 | Kroll |
| RE38,375 E | 12/2003 | Herzberg |
| 6,657,617 B2 | 12/2003 | Paolini |
| 6,657,642 B1 | 12/2003 | Bardon |
| 6,684,255 B1 | 1/2004 | Martin |
| 6,694,306 B1 | 2/2004 | Nishizawa |
| 6,717,600 B2 | 4/2004 | Dutta |
| 6,734,884 B1 | 5/2004 | Berry |
| 6,742,032 B1 | 5/2004 | Castellani |
| 6,745,236 B1 | 6/2004 | Hawkins |
| 6,765,596 B2 | 7/2004 | Lection |
| 6,781,607 B1 | 8/2004 | Benham |
| 6,798,407 B1 | 9/2004 | Benman |
| 6,801,930 B1 | 10/2004 | Dionne |
| 6,807,562 B1 | 10/2004 | Pennock |
| 6,810,418 B1 | 10/2004 | Shah |
| 6,819,669 B2 | 11/2004 | Rooney |
| 6,832,239 B1 | 12/2004 | Kraft |
| 6,836,480 B2 | 12/2004 | Basso |
| 6,845,389 B1 | 1/2005 | Sen |
| 6,854,007 B1 | 2/2005 | Hammond |
| 6,886,026 B1 | 4/2005 | Hanson |
| 6,901,379 B1 | 5/2005 | Balter |
| 6,941,236 B2 | 9/2005 | Huelsbergen |
| 6,948,168 B1 | 9/2005 | Kuprionas |
| 6,954,728 B1 | 10/2005 | Kusumoto |
| 6,954,906 B1 | 10/2005 | Kamachi |
| RE38,865 E | 11/2005 | Dumarot |
| 6,970,929 B2 | 11/2005 | Bae |
| 6,993,596 B2 | 1/2006 | Hinton |
| 7,006,616 B1 | 2/2006 | Christofferson |
| 7,028,296 B2 | 4/2006 | Irfan |
| 7,031,473 B2 | 4/2006 | Morais |
| 7,050,868 B1 | 5/2006 | Graepel |
| 7,062,533 B2 | 6/2006 | Brown |
| 7,089,083 B2 | 8/2006 | Yokoo |
| 7,089,266 B2 | 8/2006 | Stolte |
| 7,124,071 B2 | 10/2006 | Rich |
| 7,124,164 B1 | 10/2006 | Chemtob |
| 7,139,792 B1 | 11/2006 | Mishra |
| 7,143,409 B2 | 11/2006 | Herrero |
| 7,159,217 B2 | 1/2007 | Pulsipher |
| 7,185,067 B1 | 2/2007 | Viswanath |
| 7,192,352 B2 | 3/2007 | Walker |
| 7,209,137 B2 | 4/2007 | Brokenshire |
| 7,230,616 B2 | 6/2007 | Taubin |
| 7,240,093 B1 | 7/2007 | Danieli |
| 7,249,123 B2 | 7/2007 | Elder |
| 7,249,139 B2 | 7/2007 | Chuah |
| 7,250,944 B2 | 7/2007 | Anderson |
| 7,251,622 B2 | 7/2007 | Yan |
| 7,263,511 B2 | 8/2007 | Bodin |
| 7,278,108 B2 | 10/2007 | Duarte |
| 7,287,053 B2 | 10/2007 | Bodin |
| 7,292,870 B2 | 11/2007 | Heredia |
| 7,305,438 B2 | 12/2007 | Christensen |
| 7,308,476 B2 | 12/2007 | Mannaru |
| 7,314,411 B2 | 1/2008 | Lannert |
| 7,328,242 B1 | 2/2008 | McCarthy |
| 7,353,295 B1 | 4/2008 | Crow |
| 7,376,474 B2 | 5/2008 | Graepel |
| 7,383,307 B2 | 6/2008 | Kirkland |
| 7,404,149 B2 | 7/2008 | Fox |
| 7,426,538 B2 | 9/2008 | Bodin |
| 7,427,980 B1 | 9/2008 | Partridge |
| 7,428,588 B2 | 9/2008 | Berstis |
| 7,429,987 B2 | 9/2008 | Leah |
| 7,436,407 B2 | 10/2008 | Doi |
| 7,439,975 B2 | 10/2008 | Hsu |
| 7,443,393 B2 | 10/2008 | Shen |
| 7,447,996 B1 | 11/2008 | Cox |
| 7,467,180 B2 | 12/2008 | Kaufman |
| 7,467,181 B2 | 12/2008 | McGowan |
| 7,475,354 B2 | 1/2009 | Guido |
| 7,478,127 B2 | 1/2009 | Creamer |
| 7,484,012 B2 | 1/2009 | Hinton |
| 7,503,007 B2 | 3/2009 | Goodman |
| 7,506,264 B2 | 3/2009 | Polan |
| 7,509,388 B2 | 3/2009 | Allen |
| 7,512,548 B1 | 3/2009 | Bezos |
| 7,515,136 B1 | 4/2009 | Kanevsky |
| 7,517,282 B1 | 4/2009 | Pryor |
| 7,525,964 B2 | 4/2009 | Astley |
| 7,527,191 B2 | 5/2009 | Takayama |
| 7,552,177 B2 | 6/2009 | Kessen |
| 7,565,650 B2 | 7/2009 | Bhogal |
| 7,571,224 B2 | 8/2009 | Childress |
| 7,571,389 B2 | 8/2009 | Broussard |
| 7,580,888 B2 | 8/2009 | Ur |
| 7,590,984 B2 | 9/2009 | Kaufman |
| 7,593,864 B2 | 9/2009 | Shuster |
| 7,596,596 B2 | 9/2009 | Chen |
| 7,614,955 B2 | 11/2009 | Farnham |
| 7,617,283 B2 | 11/2009 | Aaron |
| 7,640,587 B2 | 12/2009 | Fox |
| 7,657,340 B2 | 2/2010 | Lind |
| 7,667,701 B2 | 2/2010 | Leah |
| 7,677,970 B2 | 3/2010 | O'Kelley, II |
| 7,698,656 B2 | 4/2010 | Srivastava |
| 7,702,730 B2 | 4/2010 | Spataro |
| 7,702,784 B2 | 4/2010 | Berstis |

(56) References Cited

U.S. PATENT DOCUMENTS

| | | |
|---|---|---|
| 7,713,116 B2 | 5/2010 | Keam |
| 7,714,867 B2 | 5/2010 | Doi |
| 7,719,532 B2 | 5/2010 | Schardt |
| 7,719,535 B2 | 5/2010 | Tadokoro |
| 7,729,951 B2 | 6/2010 | Dawson |
| 7,734,691 B2 | 6/2010 | Creamer |
| 7,737,969 B2 | 6/2010 | Shen |
| 7,743,095 B2 | 6/2010 | Goldberg |
| 7,747,679 B2 | 6/2010 | Galvin |
| 7,765,478 B2 | 7/2010 | Reed |
| 7,768,514 B2 | 8/2010 | Pagan |
| 7,770,114 B2 | 8/2010 | Sriprakash |
| 7,773,087 B2 | 8/2010 | Fowler |
| 7,774,407 B2 | 8/2010 | Daly |
| 7,780,525 B2 | 8/2010 | Walker |
| 7,780,532 B2 | 8/2010 | Van |
| 7,782,318 B2 | 8/2010 | Shearer |
| 7,792,263 B2 | 9/2010 | D Amora |
| 7,792,801 B2 | 9/2010 | Hamilton, II |
| 7,792,808 B2 | 9/2010 | Stuart |
| 7,796,128 B2 | 9/2010 | Radzikowski |
| 7,797,168 B2 | 9/2010 | Kusumoto |
| 7,801,228 B2 | 9/2010 | Lehne |
| 7,805,680 B2 | 9/2010 | Meyers |
| 7,808,500 B2 | 10/2010 | Shearer |
| 7,814,152 B2 | 10/2010 | McGowan |
| 7,824,253 B2 | 11/2010 | Thompson |
| 7,827,318 B2 | 11/2010 | Hinton |
| 7,843,471 B2 | 11/2010 | Doan |
| 7,844,663 B2 | 11/2010 | Boutboul |
| 7,844,673 B2 | 11/2010 | Bostick |
| 7,846,024 B2 | 12/2010 | Graepel |
| 7,847,799 B2 | 12/2010 | Taubin |
| 7,853,594 B2 | 12/2010 | Elder |
| 7,856,469 B2 | 12/2010 | Chen |
| 7,865,393 B2 | 1/2011 | Leason |
| 7,873,485 B2 | 1/2011 | Castelli |
| 7,882,222 B2 | 2/2011 | Dolbier |
| 7,882,243 B2 | 2/2011 | Ivory |
| 7,884,819 B2 | 2/2011 | Kuesel |
| 7,886,045 B2 | 2/2011 | Bates |
| 7,890,623 B2 | 2/2011 | Bates |
| 7,893,936 B2 | 2/2011 | Shearer |
| 7,904,829 B2 | 3/2011 | Fox |
| 7,921,128 B2 | 4/2011 | Hamilton, II |
| 7,940,265 B2 | 5/2011 | Brown |
| 7,945,620 B2 | 5/2011 | Bou-Ghannam |
| 7,945,802 B2 | 5/2011 | Hamilton, II |
| 7,955,171 B2 | 6/2011 | Jorasch |
| 7,958,047 B2 | 6/2011 | Jung |
| 7,958,055 B2 | 6/2011 | Hsu |
| 7,962,751 B2 | 6/2011 | Dudley |
| 7,970,837 B2 | 6/2011 | Lyle |
| 7,970,840 B2 | 6/2011 | Cannon |
| 7,985,132 B2 | 7/2011 | Walker |
| 7,985,138 B2 | 7/2011 | Acharya |
| 7,990,387 B2 | 8/2011 | Hamilton, II |
| 7,996,164 B2 | 8/2011 | Hamilton, II |
| 7,996,264 B2 | 8/2011 | Kusumoto |
| 7,997,987 B2 | 8/2011 | Johnson |
| 8,001,161 B2 | 8/2011 | George |
| 8,004,518 B2 | 8/2011 | Fowler |
| 8,005,025 B2 | 8/2011 | Bodin |
| 8,006,182 B2 | 8/2011 | Bates |
| 8,013,861 B2 | 9/2011 | Hamilton, II |
| 8,018,453 B2 | 9/2011 | Fowler |
| 8,018,462 B2 | 9/2011 | Bhogal |
| 8,019,797 B2 | 9/2011 | Hamilton, II |
| 8,019,858 B2 | 9/2011 | Bauchot |
| 8,022,948 B2 | 9/2011 | Garbow |
| 8,022,950 B2 | 9/2011 | Brown |
| 8,026,913 B2 | 9/2011 | Garbow |
| 8,028,021 B2 | 9/2011 | Reisinger |
| 8,028,022 B2 | 9/2011 | Brownholtz |
| 8,037,416 B2 | 10/2011 | Bates |
| 8,041,614 B2 | 10/2011 | Bhogal |
| 8,046,700 B2 | 10/2011 | Bates |
| 8,051,462 B2 | 11/2011 | Hamilton, II |
| 8,055,656 B2 | 11/2011 | Cradick |
| 8,056,121 B2 | 11/2011 | Hamilton, II |
| 8,057,307 B2 | 11/2011 | Berstis |
| 8,062,130 B2 | 11/2011 | Smith |
| 8,063,905 B2 | 11/2011 | Brown |
| 8,070,601 B2 | 12/2011 | Acharya |
| 8,082,245 B2 | 12/2011 | Bates |
| 8,085,267 B2 | 12/2011 | Brown |
| 8,089,481 B2 | 1/2012 | Shearer |
| 8,092,288 B2 | 1/2012 | Theis |
| 8,095,881 B2 | 1/2012 | Reisinger |
| 8,099,338 B2 | 1/2012 | Betzler |
| 8,099,668 B2 | 1/2012 | Garbow |
| 8,102,334 B2 | 1/2012 | Brown |
| 8,103,640 B2 | 1/2012 | Lo |
| 8,103,959 B2 | 1/2012 | Cannon |
| 8,105,165 B2 | 1/2012 | Karstens |
| 8,108,774 B2 | 1/2012 | Finn |
| 8,113,959 B2 | 2/2012 | De Judicibus |
| 8,117,551 B2 | 2/2012 | Cheng |
| 8,125,485 B2 | 2/2012 | Brown |
| 8,127,235 B2 | 2/2012 | Haggar |
| 8,127,236 B2 | 2/2012 | Hamilton, II |
| 8,128,487 B2 | 3/2012 | Hamilton, II |
| 8,131,740 B2 | 3/2012 | Cradick |
| 8,132,235 B2 | 3/2012 | Bussani |
| 8,134,560 B2 | 3/2012 | Bates |
| 8,139,060 B2 | 3/2012 | Brown |
| 8,139,780 B2 | 3/2012 | Shearer |
| 8,140,340 B2 | 3/2012 | Bhogal |
| 8,140,620 B2 | 3/2012 | Creamer |
| 8,140,978 B2 | 3/2012 | Betzler |
| 8,140,982 B2 | 3/2012 | Hamilton, II |
| 8,145,676 B2 | 3/2012 | Bhogal |
| 8,145,725 B2 | 3/2012 | Dawson |
| 8,149,241 B2 | 4/2012 | Do |
| 8,151,191 B2 | 4/2012 | Nicol, II |
| 8,156,184 B2 | 4/2012 | Kurata |
| 8,165,350 B2 | 4/2012 | Fuhrmann |
| 8,171,407 B2 | 5/2012 | Huang |
| 8,171,408 B2 | 5/2012 | Dawson |
| 8,171,559 B2 | 5/2012 | Hamilton, II |
| 8,174,541 B2 | 5/2012 | Greene |
| 8,176,421 B2 | 5/2012 | Dawson |
| 8,176,422 B2 | 5/2012 | Bergman |
| 8,184,092 B2 | 5/2012 | Cox |
| 8,184,116 B2 | 5/2012 | Finn |
| 8,185,450 B2 | 5/2012 | McVey |
| 8,185,829 B2 | 5/2012 | Cannon |
| 8,187,067 B2 | 5/2012 | Hamilton, II |
| 8,199,145 B2 | 6/2012 | Hamilton, II |
| 8,203,561 B2 | 6/2012 | Carter |
| 8,214,335 B2 | 7/2012 | Hamilton, II |
| 8,214,433 B2 | 7/2012 | Dawson |
| 8,214,750 B2 | 7/2012 | Hamilton, II |
| 8,214,751 B2 | 7/2012 | Dawson |
| 8,217,953 B2 | 7/2012 | Comparan |
| 8,219,616 B2 | 7/2012 | Dawson |
| 8,230,045 B2 | 7/2012 | Kawachiya |
| 8,230,338 B2 | 7/2012 | Dugan |
| 8,233,005 B2 | 7/2012 | Finn |
| 8,234,234 B2 | 7/2012 | Shearer |
| 8,234,579 B2 | 7/2012 | Do |
| 8,239,775 B2 | 8/2012 | Beverland |
| 8,241,131 B2 | 8/2012 | Bhogal |
| 8,245,241 B2 | 8/2012 | Hamilton, II |
| 8,245,283 B2 | 8/2012 | Dawson |
| 8,265,253 B2 | 9/2012 | D Amora |
| 8,310,497 B2 | 11/2012 | Comparan |
| 8,313,364 B2 | 11/2012 | Reynolds |
| 8,334,871 B2 | 12/2012 | Hamilton, II |
| 8,360,886 B2 | 1/2013 | Karstens |
| 8,364,804 B2 | 1/2013 | Childress |
| 8,370,370 B2 | 2/2013 | Huang |
| 8,425,326 B2 | 4/2013 | Chudley |
| 8,442,946 B2 | 5/2013 | Hamilton, II |

(56) References Cited

U.S. PATENT DOCUMENTS

| | | |
|---|---|---|
| 8,489,925 B1 | 7/2013 | Antukh |
| 8,496,531 B2 | 7/2013 | Youm |
| 8,506,372 B2 | 8/2013 | Chudley |
| 8,514,249 B2 | 8/2013 | Hamilton, II |
| 8,554,841 B2 | 10/2013 | Kurata |
| 8,607,142 B2 | 12/2013 | Bergman |
| 8,607,356 B2 | 12/2013 | Hamilton, II |
| 8,624,903 B2 | 1/2014 | Hamilton, II |
| 8,626,836 B2 | 1/2014 | Dawson |
| 8,692,835 B2 | 4/2014 | Hamilton, II |
| 8,696,465 B2 | 4/2014 | Gatto |
| 8,721,412 B2 | 5/2014 | Chudley |
| 8,777,754 B1 | 7/2014 | Santini |
| 8,827,816 B2 | 9/2014 | Bhogal |
| 8,838,640 B2 | 9/2014 | Bates |
| 8,849,917 B2 | 9/2014 | Dawson |
| 8,888,598 B2 | 11/2014 | Mehta |
| 8,911,296 B2 | 12/2014 | Chudley |
| 8,924,308 B1 | 12/2014 | Mehta |
| 8,992,316 B2 | 3/2015 | Smith |
| 9,083,654 B2 | 7/2015 | Dawson |
| 9,152,914 B2 | 10/2015 | Haggar |
| 9,205,328 B2 | 12/2015 | Bansi |
| 9,286,731 B2 | 3/2016 | Hamilton, II |
| 9,299,080 B2 | 3/2016 | Dawson |
| 9,311,741 B2* | 4/2016 | Rogers ................ G06Q 20/145 |
| 9,320,971 B2* | 4/2016 | de Jesus .............. A63F 13/822 |
| 9,364,746 B2 | 6/2016 | Chudley |
| 9,508,222 B1 | 11/2016 | McLellan |
| 9,525,746 B2 | 12/2016 | Bates |
| 9,583,109 B2 | 2/2017 | Kurata |
| 9,682,324 B2 | 6/2017 | Bansi |
| 9,764,244 B2 | 9/2017 | Bansi |
| 9,789,406 B2 | 10/2017 | Marr |
| 9,795,887 B2 | 10/2017 | Lin |
| 9,808,722 B2* | 11/2017 | Kawachiya ............. G06F 21/64 |
| 9,827,488 B2 | 11/2017 | Pearce |
| 9,942,013 B2 | 4/2018 | Malladi |
| 10,118,099 B2 | 11/2018 | Condrey |
| 10,242,413 B2* | 3/2019 | Dange .................... G06Q 50/01 |
| 10,386,988 B1 | 8/2019 | Koh |
| 10,402,731 B1 | 9/2019 | Cosic |
| 10,740,804 B2* | 8/2020 | Spivack ............. G06F 3/04883 |
| 10,963,648 B1* | 3/2021 | Bill ......................... H04W 4/12 |
| 10,981,069 B2* | 4/2021 | Kawachiya ............ A63F 13/75 |
| 2001/0007979 A1 | 7/2001 | Teshima |
| 2001/0025253 A1 | 9/2001 | Heintz |
| 2001/0032240 A1 | 10/2001 | Malone |
| 2001/0049301 A1 | 12/2001 | Masuda |
| 2001/0049651 A1 | 12/2001 | Selleck |
| 2001/0056383 A1 | 12/2001 | Shuster |
| 2002/0002514 A1 | 1/2002 | Kamachi |
| 2002/0007319 A1 | 1/2002 | Yu |
| 2002/0026388 A1 | 2/2002 | Roebuck |
| 2002/0035480 A1 | 3/2002 | Gordon |
| 2002/0035593 A1 | 3/2002 | Salim |
| 2002/0043568 A1 | 4/2002 | Hess |
| 2002/0065870 A1 | 5/2002 | Baehr-Jones |
| 2002/0073043 A1 | 6/2002 | Herman |
| 2002/0090995 A1 | 7/2002 | Haga |
| 2002/0095387 A1 | 7/2002 | Sosa |
| 2002/0095586 A1 | 7/2002 | Doyle |
| 2002/0096831 A1 | 7/2002 | Nakayama |
| 2002/0097856 A1 | 7/2002 | Wullert |
| 2002/0105533 A1 | 8/2002 | Cristo |
| 2002/0116466 A1 | 8/2002 | Trevithick |
| 2002/0124137 A1 | 9/2002 | Ulrich |
| 2002/0125312 A1 | 9/2002 | Ogilvie |
| 2002/0130904 A1 | 9/2002 | Becker |
| 2002/0135618 A1 | 9/2002 | Maes |
| 2002/0169644 A1 | 11/2002 | Greene |
| 2002/0169665 A1 | 11/2002 | Hughes |
| 2002/0184373 A1 | 12/2002 | Maes |
| 2002/0184391 A1 | 12/2002 | Phillips |
| 2002/0188688 A1 | 12/2002 | Bice |
| 2003/0004774 A1 | 1/2003 | Greene |
| 2003/0008712 A1 | 1/2003 | Poulin |
| 2003/0014297 A1 | 1/2003 | Kaufman |
| 2003/0014423 A1 | 1/2003 | Chuah |
| 2003/0032476 A1 | 2/2003 | Walker |
| 2003/0050977 A1 | 3/2003 | Puthenkulam |
| 2003/0055892 A1 | 3/2003 | Huitema |
| 2003/0056002 A1 | 3/2003 | Trethewey |
| 2003/0076353 A1 | 4/2003 | Blackstock |
| 2003/0101343 A1 | 5/2003 | Eaton |
| 2003/0112952 A1 | 6/2003 | Brown |
| 2003/0135433 A1 | 7/2003 | Yan |
| 2003/0135621 A1 | 7/2003 | Romagnoli |
| 2003/0141977 A1 | 7/2003 | Brown |
| 2003/0145128 A1 | 7/2003 | Baird |
| 2003/0149675 A1 | 8/2003 | Ansari |
| 2003/0158827 A1 | 8/2003 | Ansari |
| 2003/0164827 A1 | 9/2003 | Gottesman |
| 2003/0177187 A1 | 9/2003 | Levine |
| 2003/0195957 A1 | 10/2003 | Banginwar |
| 2003/0210265 A1 | 11/2003 | Haimberg |
| 2004/0001616 A1 | 1/2004 | Gutta |
| 2004/0014514 A1 | 1/2004 | Yacenda |
| 2004/0030888 A1 | 2/2004 | Roh |
| 2004/0053690 A1 | 3/2004 | Fogel |
| 2004/0054667 A1 | 3/2004 | Kake |
| 2004/0059781 A1 | 3/2004 | Yoakum |
| 2004/0078432 A1 | 4/2004 | Manber |
| 2004/0078596 A1 | 4/2004 | Kent |
| 2004/0088303 A1 | 5/2004 | Elder |
| 2004/0097287 A1 | 5/2004 | Postrel |
| 2004/0103079 A1 | 5/2004 | Tokusho |
| 2004/0107125 A1 | 6/2004 | Guheen |
| 2004/0110552 A1 | 6/2004 | Del Prado |
| 2004/0113756 A1 | 6/2004 | Mollenkopf |
| 2004/0122553 A1 | 6/2004 | Phan |
| 2004/0127277 A1 | 7/2004 | Walker |
| 2004/0128181 A1 | 7/2004 | Zurko |
| 2004/0143852 A1 | 7/2004 | Meyers |
| 2004/0163133 A1 | 8/2004 | Ueda |
| 2004/0166935 A1 | 8/2004 | Gavin |
| 2004/0167880 A1 | 8/2004 | Smith |
| 2004/0172339 A1 | 9/2004 | Snelgrove |
| 2004/0174392 A1 | 9/2004 | Bjoernsen |
| 2004/0186886 A1 | 9/2004 | Galli et al. |
| 2004/0205134 A1 | 10/2004 | Digate |
| 2004/0210627 A1 | 10/2004 | Kroening |
| 2004/0225387 A1 | 11/2004 | Jay |
| 2004/0228291 A1 | 11/2004 | Huslak |
| 2004/0243664 A1 | 12/2004 | Horstemeyer |
| 2004/0244006 A1 | 12/2004 | Kaufman |
| 2004/0260771 A1 | 12/2004 | Gusler et al. |
| 2004/0266505 A1 | 12/2004 | Keam |
| 2004/0268386 A1 | 12/2004 | Logan |
| 2005/0015571 A1 | 1/2005 | Kaufman |
| 2005/0021472 A1 | 1/2005 | Gettman |
| 2005/0021484 A1 | 1/2005 | Bodin |
| 2005/0027696 A1 | 2/2005 | Swaminathan |
| 2005/0043097 A1 | 2/2005 | March |
| 2005/0050137 A1 | 3/2005 | Bodin |
| 2005/0054381 A1 | 3/2005 | Lee |
| 2005/0060368 A1 | 3/2005 | Wang |
| 2005/0071306 A1 | 3/2005 | Kruszewski |
| 2005/0071428 A1 | 3/2005 | Khakoo |
| 2005/0071462 A1 | 3/2005 | Bodin |
| 2005/0075934 A1 | 4/2005 | Knight |
| 2005/0080859 A1 | 4/2005 | Lake |
| 2005/0085296 A1 | 4/2005 | Gelb |
| 2005/0091380 A1 | 4/2005 | Gonen |
| 2005/0097440 A1 | 5/2005 | Lusk |
| 2005/0102188 A1 | 5/2005 | Hutchison |
| 2005/0113164 A1 | 5/2005 | Buecheler |
| 2005/0132009 A1 | 6/2005 | Solie |
| 2005/0137015 A1 | 6/2005 | Rogers |
| 2005/0138108 A1 | 6/2005 | Galvin |
| 2005/0143174 A1 | 6/2005 | Goldman |
| 2005/0149620 A1 | 7/2005 | Kirkland |
| 2005/0161878 A1 | 7/2005 | Nally |
| 2005/0165893 A1 | 7/2005 | Feinberg |

(56) References Cited

U.S. PATENT DOCUMENTS

| | | |
|---|---|---|
| 2005/0177428 A1 | 8/2005 | Ganz |
| 2005/0177453 A1 | 8/2005 | Anton |
| 2005/0182729 A1 | 8/2005 | Kananen |
| 2005/0192864 A1 | 9/2005 | Ganz |
| 2005/0216346 A1 | 9/2005 | Kusumoto |
| 2005/0216361 A1 | 9/2005 | Fukada |
| 2005/0223075 A1 | 10/2005 | Swearingen et al. |
| 2005/0240531 A1 | 10/2005 | Wolff |
| 2005/0246711 A1 | 11/2005 | Berstis |
| 2005/0251512 A1 | 11/2005 | McCauley |
| 2005/0253840 A1 | 11/2005 | Kwon |
| 2005/0277472 A1 | 12/2005 | Gillan |
| 2006/0003305 A1 | 1/2006 | Kelmar |
| 2006/0004659 A1 | 1/2006 | Hutchison |
| 2006/0026253 A1 | 2/2006 | Kessen |
| 2006/0028475 A1 | 2/2006 | Tobias |
| 2006/0031128 A1 | 2/2006 | Lamitie |
| 2006/0031322 A1 | 2/2006 | Kessen |
| 2006/0031326 A1 | 2/2006 | Ovenden |
| 2006/0036688 A1 | 2/2006 | McMahan |
| 2006/0121990 A1 | 6/2006 | O'Kelley |
| 2006/0128460 A1 | 6/2006 | Muir |
| 2006/0129643 A1 | 6/2006 | Nielson |
| 2006/0155813 A1 | 7/2006 | Dietz et al. |
| 2006/0160589 A1 | 7/2006 | Okada |
| 2006/0161788 A1 | 7/2006 | Turpin |
| 2006/0161852 A1 | 7/2006 | Chen |
| 2006/0178966 A1 | 8/2006 | Jung |
| 2006/0178968 A1 | 8/2006 | Jung |
| 2006/0178975 A1 | 8/2006 | Jung |
| 2006/0184260 A1 | 8/2006 | Graepel |
| 2006/0190591 A1 | 8/2006 | Bobde |
| 2006/0194632 A1 | 8/2006 | Hendrickson |
| 2006/0195462 A1 | 8/2006 | Rogers |
| 2006/0234795 A1 | 10/2006 | Dhunjishaw |
| 2006/0252526 A1 | 11/2006 | Walker |
| 2006/0258462 A1 | 11/2006 | Cheng |
| 2006/0258463 A1 | 11/2006 | Cugno |
| 2007/0002057 A1 | 1/2007 | Danzig |
| 2007/0026934 A1 | 2/2007 | Herbrich |
| 2007/0026942 A1 | 2/2007 | Kinsley |
| 2007/0050716 A1 | 3/2007 | Leahy |
| 2007/0066400 A1 | 3/2007 | Kogo |
| 2007/0066403 A1 | 3/2007 | Conkwright |
| 2007/0073582 A1 | 3/2007 | Jung |
| 2007/0087799 A1 | 4/2007 | Van Luchene |
| 2007/0087822 A1 | 4/2007 | Van |
| 2007/0087831 A1 | 4/2007 | Van |
| 2007/0106526 A1 | 5/2007 | Jung |
| 2007/0111770 A1 | 5/2007 | Van |
| 2007/0111789 A1 | 5/2007 | van Deursen |
| 2007/0112574 A1 | 5/2007 | Greene |
| 2007/0112624 A1 | 5/2007 | Jung |
| 2007/0112706 A1 | 5/2007 | Herbrich |
| 2007/0117623 A1 | 5/2007 | Nelson |
| 2007/0117636 A1 | 5/2007 | Takahashi |
| 2007/0130001 A1 | 6/2007 | Jung |
| 2007/0155508 A1 | 7/2007 | Sun |
| 2007/0168444 A1 | 7/2007 | Chen |
| 2007/0168447 A1 | 7/2007 | Chen |
| 2007/0173323 A1 | 7/2007 | Johnson |
| 2007/0180040 A1 | 8/2007 | Etgen |
| 2007/0202951 A1 | 8/2007 | Bogosian |
| 2007/0214117 A1 | 9/2007 | Shu |
| 2007/0218987 A1 | 9/2007 | Van |
| 2007/0218997 A1 | 9/2007 | Cho |
| 2007/0223607 A1 | 9/2007 | Lehne |
| 2007/0226119 A1 | 9/2007 | Balser |
| 2007/0226176 A1 | 9/2007 | Bestgen |
| 2007/0233839 A1 | 10/2007 | Gaos |
| 2007/0247979 A1 | 10/2007 | Brillon |
| 2007/0255677 A1 | 11/2007 | Alexander |
| 2007/0260567 A1 | 11/2007 | Funge |
| 2007/0265718 A1 | 11/2007 | Graepel |
| 2007/0265969 A1 | 11/2007 | Horwat |
| 2007/0281285 A1 | 12/2007 | Jayaweera |
| 2007/0282695 A1 | 12/2007 | Toper |
| 2007/0288387 A1 | 12/2007 | Park |
| 2007/0298867 A1 | 12/2007 | Huang |
| 2008/0004094 A1 | 1/2008 | Mueller |
| 2008/0004116 A1 | 1/2008 | Van |
| 2008/0014917 A1 | 1/2008 | Rhoads |
| 2008/0019353 A1 | 1/2008 | Foote |
| 2008/0059304 A1 | 3/2008 | Kimsey |
| 2008/0059570 A1* | 3/2008 | Bill .................. G06T 19/006 709/203 |
| 2008/0064467 A1 | 3/2008 | Reiner |
| 2008/0086382 A1 | 4/2008 | Ur |
| 2008/0097891 A1 | 4/2008 | Park |
| 2008/0113815 A1 | 5/2008 | Weingardt |
| 2008/0120558 A1 | 5/2008 | Nathan |
| 2008/0126350 A1 | 5/2008 | Shoemaker |
| 2008/0133392 A1 | 6/2008 | Jung |
| 2008/0155019 A1 | 6/2008 | Wallace |
| 2008/0159634 A1 | 7/2008 | Sharma |
| 2008/0162317 A1 | 7/2008 | Banaugh |
| 2008/0176655 A1 | 7/2008 | James |
| 2008/0207327 A1 | 8/2008 | Van |
| 2008/0207329 A1 | 8/2008 | Wallace |
| 2008/0208749 A1 | 8/2008 | Wallace |
| 2008/0209527 A1 | 8/2008 | Dudley |
| 2008/0214287 A1 | 9/2008 | Lutnick |
| 2008/0215540 A1 | 9/2008 | Bestgen |
| 2008/0215975 A1 | 9/2008 | Harrison |
| 2008/0220876 A1 | 9/2008 | Mehta |
| 2008/0222104 A1 | 9/2008 | Stewart |
| 2008/0228607 A1 | 9/2008 | Jung |
| 2008/0235111 A1 | 9/2008 | Dotan |
| 2008/0242420 A1 | 10/2008 | Graepel |
| 2008/0252716 A1 | 10/2008 | Kano |
| 2008/0254893 A1 | 10/2008 | Patel |
| 2008/0263460 A1 | 10/2008 | Altberg |
| 2008/0268943 A1 | 10/2008 | Jacob |
| 2008/0270605 A1 | 10/2008 | Berstis |
| 2008/0270916 A1 | 10/2008 | Chen |
| 2008/0275789 A1 | 11/2008 | Ganz |
| 2008/0281622 A1 | 11/2008 | Hoal |
| 2008/0282090 A1 | 11/2008 | Leybovich |
| 2008/0288343 A1 | 11/2008 | Ho |
| 2008/0297515 A1 | 12/2008 | Bliss |
| 2008/0301405 A1 | 12/2008 | Kaufman |
| 2009/0005172 A1 | 1/2009 | Shibahara |
| 2009/0030774 A1 | 1/2009 | Rothschild |
| 2009/0063283 A1 | 3/2009 | Kusumoto |
| 2009/0075738 A1 | 3/2009 | Pearce |
| 2009/0083192 A1 | 3/2009 | Bokor |
| 2009/0088233 A1 | 4/2009 | O'Rourke |
| 2009/0089157 A1 | 4/2009 | Narayanan |
| 2009/0094225 A1 | 4/2009 | Cradick |
| 2009/0099925 A1 | 4/2009 | Mehta |
| 2009/0100352 A1 | 4/2009 | Huang |
| 2009/0113448 A1 | 4/2009 | Smith |
| 2009/0118006 A1 | 5/2009 | Kelly |
| 2009/0137320 A1 | 5/2009 | Kimura |
| 2009/0144633 A1 | 6/2009 | Schultz |
| 2009/0157495 A1 | 6/2009 | Cahuzac |
| 2009/0157625 A1 | 6/2009 | Jung |
| 2009/0209335 A1 | 8/2009 | Pearce |
| 2009/0210885 A1 | 8/2009 | Bantz |
| 2009/0216546 A1 | 8/2009 | Huang |
| 2009/0228550 A1 | 9/2009 | Kawachiya |
| 2009/0234948 A1 | 9/2009 | Garbow |
| 2009/0235191 A1 | 9/2009 | Garbow |
| 2009/0248544 A1 | 10/2009 | Ganz |
| 2009/0253494 A1 | 10/2009 | Fitch |
| 2009/0254417 A1 | 10/2009 | Beilby |
| 2009/0280909 A1 | 11/2009 | McEniry |
| 2009/0287765 A1 | 11/2009 | Hamilton |
| 2009/0299960 A1 | 12/2009 | Lineberger |
| 2009/0307021 A1 | 12/2009 | Hamilton |
| 2009/0325711 A1 | 12/2009 | Bronstein |
| 2010/0030578 A1 | 2/2010 | Siddique |
| 2010/0131864 A1 | 5/2010 | Bokor |
| 2010/0169798 A1 | 7/2010 | Hyndman |

(56) References Cited

U.S. PATENT DOCUMENTS

| | | |
|---|---|---|
| 2010/0169800 A1 | 7/2010 | Lance |
| 2010/0173701 A1 | 7/2010 | Van Luchene |
| 2010/0173713 A1 | 7/2010 | Van Luchene |
| 2010/0203963 A1 | 8/2010 | Allen |
| 2010/0205179 A1 | 8/2010 | Carson |
| 2010/0210349 A1 | 8/2010 | Blair |
| 2010/0267450 A1 | 10/2010 | McMain |
| 2010/0280919 A1 | 11/2010 | Everett |
| 2010/0293569 A1 | 11/2010 | Kusumoto |
| 2010/0304839 A1 | 12/2010 | Johnson |
| 2010/0306672 A1 | 12/2010 | McEniry |
| 2011/0010270 A1 | 1/2011 | Hamilton |
| 2011/0092279 A1 | 4/2011 | Pilip |
| 2011/0107433 A1 | 5/2011 | Steelberg |
| 2011/0126272 A1 | 5/2011 | Betzler |
| 2011/0131085 A1 | 6/2011 | Wey |
| 2011/0190063 A1 | 8/2011 | Kajii |
| 2011/0208615 A1 | 8/2011 | Steelberg |
| 2011/0212762 A1 | 9/2011 | Ocko |
| 2011/0261071 A1 | 10/2011 | Ganetakos |
| 2011/0281638 A1 | 11/2011 | Bansi |
| 2012/0009997 A1 | 1/2012 | Youm |
| 2012/0010734 A1 | 1/2012 | Youm |
| 2012/0015736 A1 | 1/2012 | Vanbragt |
| 2012/0021823 A1 | 1/2012 | Youm |
| 2012/0021825 A1 | 1/2012 | Harp |
| 2012/0064968 A1 | 3/2012 | Youm |
| 2012/0094751 A1 | 4/2012 | Reynolds |
| 2012/0122552 A1 | 5/2012 | Youm |
| 2012/0142429 A1 | 6/2012 | Muller |
| 2012/0190456 A1 | 7/2012 | Rogers |
| 2012/0244950 A1 | 9/2012 | Braun |
| 2012/0315993 A1 | 12/2012 | Dumont |
| 2012/0316999 A1 | 12/2012 | Koh |
| 2013/0111367 A1 | 5/2013 | Park |
| 2013/0143670 A1 | 6/2013 | Junkin |
| 2013/0225260 A1 | 8/2013 | Cudak |
| 2013/0252737 A1 | 9/2013 | Mescon |
| 2013/0260876 A1 | 10/2013 | Margalith |
| 2013/0266927 A1 | 10/2013 | Mann |
| 2013/0274001 A1* | 10/2013 | de Jesus ............... A63F 13/822 463/25 |
| 2013/0296046 A1 | 11/2013 | Mianji |
| 2014/0004955 A1 | 1/2014 | Nahari |
| 2014/0004960 A1 | 1/2014 | Soti |
| 2014/0011595 A1 | 1/2014 | Muller |
| 2014/0024445 A1 | 1/2014 | Aller |
| 2014/0114845 A1* | 4/2014 | Rogers ................. G06Q 20/145 705/39 |
| 2014/0162763 A1 | 6/2014 | Kim |
| 2014/0162781 A1 | 6/2014 | Butler |
| 2014/0235356 A1 | 8/2014 | Yamane |
| 2014/0274402 A1 | 9/2014 | Michel |
| 2014/0342808 A1 | 11/2014 | Chowdhary |
| 2014/0344725 A1 | 11/2014 | Bates |
| 2014/0349753 A1 | 11/2014 | Lmai |
| 2015/0024852 A1 | 1/2015 | Pacey |
| 2015/0031426 A1 | 1/2015 | Alloway |
| 2015/0038233 A1 | 2/2015 | Rom |
| 2015/0051000 A1 | 2/2015 | Henn |
| 2015/0220836 A1 | 8/2015 | Wilson |
| 2015/0310698 A1 | 10/2015 | Polis |
| 2016/0001181 A1 | 1/2016 | Marr |
| 2016/0001182 A1 | 1/2016 | Marr |
| 2016/0001186 A1 | 1/2016 | Marr |
| 2016/0005270 A1 | 1/2016 | Marr |
| 2016/0067611 A1 | 3/2016 | Ware |
| 2016/0067612 A1 | 3/2016 | Ntoulas |
| 2016/0166935 A1 | 6/2016 | Condrey |
| 2016/0180598 A1* | 6/2016 | Rogers ................. G06Q 20/145 345/633 |
| 2016/0191671 A1 | 6/2016 | Dawson |
| 2016/0210602 A1* | 7/2016 | Siddique ............ G06Q 20/384 |
| 2016/0296840 A1 | 10/2016 | Kaewell |
| 2016/0358239 A1 | 12/2016 | Inagaki |
| 2017/0052676 A1 | 2/2017 | Pulier |
| 2017/0178236 A1 | 6/2017 | Saigh |
| 2017/0186232 A1* | 6/2017 | Dange ..................... G06T 19/00 |
| 2017/0206797 A1 | 7/2017 | Solomon |
| 2017/0259178 A1 | 9/2017 | Aghdaie |
| 2017/0264681 A1 | 9/2017 | Apte |
| 2017/0279719 A1 | 9/2017 | Faith |
| 2017/0294209 A1* | 10/2017 | Newell .............. H04N 21/8106 |
| 2018/0104586 A1 | 4/2018 | Kim |
| 2018/0104595 A1 | 4/2018 | Kawachiya |
| 2018/0169515 A1 | 6/2018 | Rice |
| 2018/0280806 A1 | 10/2018 | Otomo |
| 2018/0308473 A1 | 10/2018 | Scholar |
| 2019/0043239 A1 | 2/2019 | Goel |
| 2019/0081848 A1 | 3/2019 | Zou |
| 2019/0107935 A1* | 4/2019 | Spivack ................. G06T 13/40 |
| 2019/0126150 A1 | 5/2019 | Tartaj |
| 2019/0163871 A1* | 5/2019 | Curbera ................. G16H 10/60 |
| 2019/0205727 A1 | 7/2019 | Lin |
| 2019/0295306 A1 | 9/2019 | Weston |
| 2019/0340419 A1 | 11/2019 | Milman |
| 2019/0358547 A1* | 11/2019 | Mack ................... A63F 13/5255 |
| 2020/0122040 A1 | 4/2020 | Juliani, Jr. |
| 2020/0145615 A1 | 5/2020 | Seko |
| 2020/0289943 A1* | 9/2020 | Rico .................... G06K 9/6256 |
| 2020/0311245 A1 | 10/2020 | Pollard |
| 2020/0372400 A1 | 11/2020 | Carreira-Perpiñán |
| 2020/0401576 A1 | 12/2020 | Yerli |
| 2021/0019717 A1* | 1/2021 | Flinter ...................... H04L 9/50 |
| 2021/0082044 A1* | 3/2021 | Sliwka ................. G06Q 40/025 |
| 2021/0138349 A1* | 5/2021 | Zien ........................ A63F 13/73 |
| 2021/0182500 A1* | 6/2021 | Bill ........................ G06F 40/284 |

FOREIGN PATENT DOCUMENTS

| | | |
|---|---|---|
| CA | 2143874 | 6/2000 |
| CA | 2292678 | 7/2005 |
| CA | 2552135 | 7/2013 |
| CN | 1334650 A | 2/2002 |
| CN | 1202652 C | 10/2002 |
| CN | 1141641 C | 3/2004 |
| CN | 1494679 A | 5/2004 |
| CN | 1219384 | 9/2005 |
| CN | 1858757 A | 11/2006 |
| CN | 1307544 | 3/2007 |
| CN | 100407675 | 7/2008 |
| CN | 100423016 C | 10/2008 |
| CN | 100557637 | 11/2009 |
| CN | 101001678 B | 5/2010 |
| CN | 101436242 | 12/2010 |
| CN | 101801482 B | 12/2014 |
| EP | 668583 | 8/1995 |
| EP | 0969430 A1 | 1/2000 |
| EP | 0627728 B1 | 9/2000 |
| EP | 0717337 B1 | 8/2001 |
| EP | 1207694 A2 | 5/2002 |
| EP | 1209849 A2 | 5/2002 |
| EP | 0679977 B1 | 10/2002 |
| EP | 0679978 B1 | 3/2003 |
| EP | 0890924 B1 | 9/2003 |
| EP | 1377902 B1 | 8/2004 |
| EP | 0813132 B1 | 1/2005 |
| EP | 1380133 B1 | 3/2005 |
| EP | 1021021 B1 | 9/2005 |
| EP | 0930584 B1 | 10/2005 |
| EP | 0883087 B1 | 8/2007 |
| EP | 1176828 B1 | 10/2007 |
| EP | 2076888 B1 | 7/2015 |
| GB | 2339938 | 10/2002 |
| GB | 2352154 | 7/2003 |
| JP | H11191097 A | 4/1999 |
| JP | 11191097 | 7/1999 |
| JP | 3033956 B2 | 4/2000 |
| JP | 3124916 B2 | 1/2001 |
| JP | 2001119403 A | 4/2001 |
| JP | 3177221 B2 | 6/2001 |
| JP | 2001204973 A | 7/2001 |
| JP | 3199231 B2 | 8/2001 |
| JP | 2001230883 A | 8/2001 |

(56) References Cited

FOREIGN PATENT DOCUMENTS

| | | |
|---|---|---|
| JP | 3210558 B2 | 9/2001 |
| JP | 3275935 | 2/2002 |
| JP | 3361745 | 1/2003 |
| JP | 3368188 B2 | 1/2003 |
| JP | 3470955 B | 9/2003 |
| JP | 3503774 | 12/2003 |
| JP | 2004062539 A | 2/2004 |
| JP | 3575598 | 7/2004 |
| JP | 3579823 B | 7/2004 |
| JP | 3579154 B2 | 10/2004 |
| JP | 2005050081 A | 2/2005 |
| JP | 2005234633 A | 9/2005 |
| JP | 3701773 B2 | 10/2005 |
| JP | 3777161 | 3/2006 |
| JP | 3914430 B | 2/2007 |
| JP | 3942090 B | 4/2007 |
| JP | 3962361 | 5/2007 |
| JP | 4009235 B | 9/2007 |
| JP | 4225376 | 12/2008 |
| JP | 4653075 | 12/2010 |
| JP | 5063698 B | 8/2012 |
| JP | 5159375 B2 | 3/2013 |
| JP | 5352200 B2 | 11/2013 |
| JP | 5550720 B2 | 7/2014 |
| JP | 2015002839 A | 1/2015 |
| JP | 5734566 B2 | 6/2015 |
| KR | 20020038229 A | 5/2002 |
| KR | 20030039019 A | 5/2003 |
| MY | 117864 A | 8/2004 |
| SG | 55396 | 12/1998 |
| TW | 424213 | 3/2001 |
| TW | 527825 | 4/2003 |
| WO | 0060444 A1 | 10/2000 |
| WO | 0062231 A1 | 10/2000 |
| WO | 0137162 A2 | 5/2001 |
| WO | 0201455 A2 | 1/2002 |
| WO | 0203645 A2 | 1/2002 |
| WO | 2002073457 | 9/2002 |
| WO | 20020087156 | 10/2002 |
| WO | 03044755 A1 | 5/2003 |
| WO | 03049459 A1 | 6/2003 |
| WO | 03058518 A2 | 7/2003 |
| WO | 2004086212 | 10/2004 |
| WO | 2005079538 | 9/2005 |
| WO | 2007101785 | 9/2007 |
| WO | 2008037599 | 4/2008 |
| WO | 2008074627 | 6/2008 |
| WO | 2008095767 | 8/2008 |
| WO | 2009037257 | 3/2009 |
| WO | 2009104564 | 8/2009 |
| WO | 2010096738 A1 | 8/2010 |

OTHER PUBLICATIONS

K. Loesing et al., "Privacy-aware presence management in instant messaging systems", Distributed & Mobile Syst. Group, Otto-Friedrich-Univ. Germany, Proceedings. 20th International Parallel and Distributed Processing Symposium Rhodes Island, Greece; (IEEE Cat. No. 06TH8860), 2006, 8 pp.

"Universally Unique Identifier", 2006 (http://en.wikipedia.org/wiki/UUID).

Peter Jorissen et al., "Dynamic Interactions in Physically Realistic Collaborative Virtual Environments," 2005, IEEE Transactions on Visualization and Computer Graphics, vol. 11, No. 6, published by IEEE Computer Society, pp. 649-660.

E-Entrepreneurship: Learning in a Simulated Environment Salim Jiwa, Dawn Lavelle, Arjun Rose. Journal of Electronic Commerce in Organizations. Hershey: Jul.-Sep. 2005. vol. 3, Iss. 3.

Roaming Virtual World Is a Real Trip; [Final Edition] Leslie Walker. The Washington Post. Washington, D.C.: Mar. 30, 2006.

Lee et al., "A Self-Adjusting Data Distribution Mechanism for Multidimensional Load Balancing in Multiprocessor-Based Database Systems," Information Systems vol. 19, No. 7, pp. 549-567, 1994.

Mauve, M., Fischer, S., and Widmer, J. 2002. A generic proxy system for networked computer games. In Proceedings of the 1st Workshop on Network and System Support for Games (Braunschweig, Germany, Apr. 16-17, 2002). NetGames '02. ACM, New York, NY, 25-28. DOI= http://doi.acm.org/10.1145/566500.566504.

"A multi-server architecture for distributed virtual walkthrough" http://delivery.acm.org/10.1145/590000/585768/p163-ng.pdf?key1=585768&key-2=0554824911&coll=GUIDE&dl=GUIDE&CFID=41712537&CFTOKEN=50783297. Nov. 11, 2002.

Duong et al; "A dynamic load sharing algorithm for massivly multiplayer online games" published Sep. 28, 2003-Oct. 1, 2003. http://ieeexplore.ieee.org/iel5/8945/28322/01266179.pdf?tp=&arnumber-=1266179&isnumber=28322http://ieeexplore.ieee.org/xpl/absprintf.jsp?arnumb- er=1266179.

IBM, Transcoding: Extending e-business to new environments, Britton et al., Sep. 22, 2000.

IBM developerWorks, OptimalGrid—autonomic computing on the Grid, James H. Kaufman; Tobin J. Lehman; Glenn Deen; and John Thomas, Jun. 2003.

International Search Report as Published as WO2005/079538 in corresponding international application No. PCT/US2005/005550. Jul. 5, 2006.

Feldman, R. "Mining unstructured data". Tutorial notes for ACK SIGKDD 1999. ACM Press. 182-236.

Wang, Y. "Web Mining and Knowledge Discovery of Usage Patterns". CS748T Project (Part I) Feb. 2000.

Sack, W. "Conversation Map: a content-based Usenet newsgroup browser". Proceedings of the 2000 International Conference on Intelligent User Interfaces. ACM Press. 233-240.

Srivastava, Jaidepp, Robert Cooley, Mukund Deshpande, Pang-Ning Tan. "Web Usage Mining: Discovery and Applications of Usage Patterns from Web Data". SIGKDD Explorations, vol. 1, Issue 2. Jan. 2000. 12-23.

Garton, L., C. Haythornthwaite, B. Wellman. "Studying on-line social networks in Doing Internet Research", Jun. 1997.

Ackerman, M.S., B. Starr. "Social activity indicators: interface components for CSCWsystems". Proceedings of the 8th ACM Symposium on User Interface and Software Technology. ACM Press. 159-168, Nov. 14-17, 1995.

Qureshi, S. "Supporting electronic group processes: a social perspective". Proceedings of the 1995 ACM SIGCPR Conference on Supporting teams, groups, and learning inside the IS function. ACM Press. 24-34.

Wellman, B. "For a social network analysis of computer networks: a sociological perspective on collaborative work and virtual community". Proceedings of the 1996 conference on ACM SIGCPR/SIGMIS. 1-11.

Schwartz, M. F., D. C. M. Wood. "Discovering shared interests among people using graph analysis of global electronic mail traffic". Department of Computer Science, University of Colorado, Boulder CO. Oct. 1992.

Kautz, H., B. Selman, M. Shah.. "Referral Web: Combining Social Networks and Collaborative Filtering". Communications of the ACM, vol. 40, No. 3, Mar. 1997.

Barr et al., "Changing the Virtual Self, Avatar Transformations in Popular Games," 8 pages, pulled from http://www.mcs.vuw.ac.nz/.about.chikken/research/papers/cgie2006/Transfor-mingVirtualSelf.pdf.

"Fascinating Facts about the Invention of Cabbage Patch kids by Xavier Roberts in 1983," http://www.ideafinder.com/history/inventions/cabbagepatch.htm, Oct. 25. 2006.

"CMAX Promotional Footwear," http://web.archive.org/web/20040405163227/http://promo.customatix.com/, Apr. 5, 2004.

Plouznikoff, Alexandre, et al., Enhancing Human-Machine Interactions: Virtual Interface Alteration Through Wearable Computers, CHI 2006 Proceedings, Interaction Methods, Apr. 22-27, 2006, Montreal, Quebec, Canada.

V. Stojanovic, "Virtual boutique-try clothes on-line", 5th International Conference on Telecommunications in Modern Satellite, Cable and Broadcasting Service. TELSIKS 2001. Proceedings of Papers (Cat. No. 01EX517), 2001, pt. 2, p. 802-3 vol. 2.

(56) References Cited

OTHER PUBLICATIONS

Y. Zhao et al., "A 3D virtual shopping mall that has the intelligent virtual purchasing guider and cooperative purchasing functionalities", CSCWD 2004—8th International Conference on Computer Supported Cooperative Work in Design—Proceedings, 2004, p. 381-385.
Jancke, Gavin, et al., Linking Public Spaces: Technical and Social Issues, CHI 2001, Mar. 31-Apr. 5, 2006, vol. No. 4, issue No. 1.
Hassen et al., "ATask-and Data-Parallel Programming Language Based on Shared Objects," ACM Transactions on Programming Languages and Systems, vol. 20, No. 6, Nov. 1998, pp. 1131-1170.
Ma et al., "A Scalable Parallel Cell-Projection Volume Rendering Algorithm for Three-Dimensional Unstructured Data", IEEE 1997, pp. 1-10.
Andert, "A Simulation of Dynamic Task Allocation in a Distributed Computer System," Proceedings of the 1987 Winter Simulation Conference, 1987, pp. 1-9.
Feng et al., "A Parallel Hierarchical Radiosity Algorithm for Complex Scenes," Proceedings IEEE Symposium on Parallel Rendering (PRS) '97), IEEE Computer Society Technical Committee on Computer Graphics in cooperation with ACM SIGGRAPH pp. 71-79, 1997.

\* cited by examiner

302 — Creating a Database of Virtual Items, Owned by At Least One First Player, that are Conditionally Accessible to At Least One Second Player is Generated. The Conditional Accessibility is Determined Based on At Least One Predefined Condition

304 — An Attribute of an In-game Virtual Item Owned by a First Player is Modified in Order to Notify Other Players of a Video Game that the Item May be Made Conditionally Available to One or More of the Players for a Predefined Period of Time Upon Fulfillment of One or More Conditions

306 — One or More Second Players Fulfill the One or More Access Conditions in Order to Obtain the Item for the Period of Time

308 — The Item is made Conditionally Accessible to the One or More Second Players who have Fulfilled the Access Condition(s) for the Period of Time

310 — Data Structures Associated with the First Player and the One or More Second Players are Modified to Reflect the Conditional Access of the Item for the Predefined Period of Time

312 — Has the Time Period Elapsed?

313 (Yes) — The Accessibility of the Item is Withdrawn from the One or More Players

316 (No) — Proceed with Game

314 — Data Structures Associated with the First Player and the One or More Players are Modified to Reflect the Termination of Conditional Accessibility

| Virtual Item (ID) | Attribute | | |
|---|---|---|---|
| | Availably Time | Color Change | Descriptor Change |
| | | | |
| | | | |

SYSTEM AND METHOD FOR PROVIDING CONDITIONAL ACCESS TO VIRTUAL GAMING ITEMS

CROSS-REFERENCE

The present specification relies on, for priority, U.S. Patent Provisional Application No. 62/933,209 titled "System and Method For Providing Conditional Access to Virtual Gaming Items", filed on Nov. 8, 2019, which is incorporated by reference herein in its entirety.

FIELD

The present specification is related generally to the field of gaming, animation and computer graphics. More specifically, the present specification discloses systems and methods for providing conditional accessibility of in-game virtual items to players.

BACKGROUND

The proliferation of reliable and affordable broadband services allows for a greater number of people to enjoy computer or video games of various genres. For example, in some computer games, players conquer territories or complete other missions for ever-increasing rewards. In many role-playing games (RPG) or first-person shooter (FPS) games, each player controls the actions of at least one character. In addition, players develop unique characters and by controlling the actions of the characters they create during gameplay, the players (via their characters) accumulate various in-game objects and abilities through extended play. The rules for how quickly, how many and what type of in-game abilities and objects a character may earn or gain usually involves several ratings or statistics. These ratings determine the outcome of various chance or future events that lead to new in-game objects and abilities.

In most of the currently available video games, players have the option to either acquire or earn through gameplay, in-game items (such as objects or abilities) permanently tied to their gaming account. Examples of these items include, but are not limited to, weapon skins, character outfits, and character dances. In various games, a player's success in gameplay is determined by the number of in-game objects and abilities gathered by the player. In some other games, a player may be required to obtain one or more predefined in-game objects and abilities to be able to progress further in the game. Some of these in-game items may be difficult to obtain either due to their limited availability or because the process of obtaining said items requires a high level of skill in game-play. The rarity of said in-game items may vary and may be classified accordingly. In some formats, the in-game items may be classified as "common", "rare", "epic", or "legendary", in order of increasing rarity.

In some cases, a player of a video game may be in possession of one or more in-game items, but may not be using said items during game-play. Some of these items may be 'rare' and difficult to obtain and may be sought after by other players of said game. Access to these in-game items lying unused in a first player's gaming inventory may improve the gameplay experience for a second player who does not possess said items.

Hence, there is need for a method through which unused gaming inventory items of one player may be made conditionally or selectively accessible, upon fulfillment of one or more predefined conditions, to a second player for improving the gameplay experience of the second player. There is also a need for managed data structures that can effectively track and associate inventory items with specific players and to provide selective, controlled, and/or conditional access to the same inventory items to other players who may not have attain those inventory items through standard gameplay.

SUMMARY

The following embodiments and aspects thereof are described and illustrated in conjunction with systems, tools and methods, which are meant to be exemplary and illustrative, and not limiting in scope. The present application discloses numerous embodiments.

In some embodiments, the present specification is directed towards a method for providing conditional access to a virtual gaming item that is allocated to a first player of a video game, wherein the video game provides conditional access to the virtual gaming item to a second player, the method comprising: generating a data set of conditionally accessible virtual video game items in a form of an electronically stored data structure, wherein the conditionally accessible virtual video game items include the virtual gaming item; using the data structure, logically associating at least one predefined condition with each of the virtual video game items; generating a plurality of graphical user interfaces in the video game, wherein at least one of the plurality of graphical user interfaces is configured to prompt for, and receive, data representative of one or more attributes of each of the conditionally accessible virtual video game items and wherein the one or more attributes are at least indicative of one or more predefined periods of time for which each of the conditionally accessible virtual video game items is conditionally accessible; monitoring data generated by an execution of the video game to determine if the at least one predefined condition for the virtual gaming item is met by the second player; based on data generated by the execution of the video game and representative of the at least one predefined condition being met by the second player, at least temporarily providing access to the virtual gaming item to the second player within the video game and at least temporarily denying access to virtual gaming item to the first player within the video game; and after the one or more predefined periods of time elapses, providing access to the virtual gaming item to the first player within the video game and denying access to the second player within the video game.

Optionally, the method further comprises notifying the first player that the virtual item is being made accessible to the second player for the one or more predefined periods of time.

Optionally, the method further comprises modifying at least one data structure associated with each of the first player, the second player, and the virtual gaming item to record said conditional accessibility to the virtual gaming item and a first time.

Optionally, the method further comprises determining if the one or more predefined periods of time has elapsed by acquiring a current time, determining a difference between the current time and the first time, and terminating conditional accessibility to the virtual gaming item for the second player if the difference is equal to or greater than the one or more predefined periods of time.

Optionally, the method further comprises modifying the at least one data structure associated with each of the first player, the second player, and the virtual gaming item to record the termination of the conditional accessibility to the virtual gaming item.

Optionally, the method further comprises generating a graphical user interface to notify at least the second player that the virtual gaming item is conditionally available upon fulfillment of the at least one predefined condition.

Optionally, the one or more attributes further comprises at least one of a color of the conditionally accessible virtual video game items or a descriptor of the conditionally accessible virtual video game items.

Optionally, the at least one predefined condition comprises a transfer of a predefined amount of virtual value to the first player by the second player.

Optionally, the at least one predefined condition comprises reaching a predefined gaming level by the second player.

Optionally, the method further comprises determining if a predefined percentage of a total number of the conditionally accessible virtual video game items has been obtained by a total player population playing the video game before enabling the virtual gaming item to be conditionally accessible.

In some embodiments, the present specification is directed toward a computer readable non-transitory medium comprising a plurality of executable programmatic instructions wherein, when said plurality of executable programmatic instructions are executed by a processor, conditional access to a virtual gaming item that is allocated to a first player of a video game is provided to a second player in a multi-player video gaming network, said multi-player video gaming network comprising at least one game server in data communication with client devices of the first player and the second player and wherein, when said plurality of executable programmatic instructions are executed by a processor, the video game: generates a data set of conditionally accessible virtual video game items in a form of an electronically stored data structure, wherein the conditionally accessible virtual video game items include the virtual gaming item; logically associates at least one predefined condition with each of the virtual video game items in the data structure; generates a plurality of graphical user interfaces, wherein at least one of the plurality of graphical user interfaces is configured to prompt for, and receive, data representative of one or more attributes of each of the conditionally accessible virtual video game items and wherein the one or more attributes are at least indicative of one or more predefined periods of time for which each of the conditionally accessible virtual video game items is conditionally accessible; monitors data generated by an execution of the video game to determine if the at least one predefined condition for the virtual gaming item is met by the second player; based on data generated by the execution of the video game and representative of the at least one predefined condition being met by the second player, at least temporarily provide access to the virtual gaming item to the second player within the video game and at least temporarily deny access to virtual gaming item to the first player within the video game; and after the one or more predefined periods of time elapses, provide access to the virtual gaming item to the first player within the video game and deny access to the second player within the video game.

Optionally, when said plurality of executable programmatic instructions are executed by a processor, the video game further notifies the first player that the virtual item is being made accessible to the second player for the one or more predefined periods of time.

Optionally, when said plurality of executable programmatic instructions are executed by a processor, the video game further modifies at least one data structure associated with each of the first player, the second player, and the virtual gaming item to record said conditional accessibility to the virtual gaming item and a first time.

Optionally, when said plurality of executable programmatic instructions are executed by a processor, the video game further determines if the one or more predefined periods of time has elapsed by acquiring a current time, determining a difference between the current time and the first time, and terminating conditional accessibility to the virtual gaming item for the second player if the difference is equal to or greater than the one or more predefined periods of time.

Optionally, when said plurality of executable programmatic instructions are executed by a processor, the video game further modifies the at least one data structure associated with each of the first player, the second player, and the virtual gaming item to record the termination of the conditional accessibility to the virtual gaming item.

Optionally, when said plurality of executable programmatic instructions are executed by a processor, the video game further generates a graphical user interface to notify at least the second player that the virtual gaming item is conditionally available upon fulfillment of the at least one predefined condition.

Optionally, the one or more attributes further comprises at least one of a color of the conditionally accessible virtual video game items or a descriptor of the conditionally accessible virtual video game items.

Optionally, the at least one predefined condition comprises a transfer of a predefined amount of virtual value to the first player by the second player.

Optionally, the at least one predefined condition comprises reaching a predefined gaming level by the second player.

Optionally, when said plurality of executable programmatic instructions are executed by a processor, the video game further determines if a predefined percentage of a total number of the conditionally accessible virtual video game items has been obtained by a total player population playing the video game before enabling the virtual gaming item to be conditionally accessible.

The aforementioned and other embodiments of the present shall be described in greater depth in the drawings and detailed description provided below.

BRIEF DESCRIPTION OF THE DRAWINGS

These and other features and advantages of the present specification will be further appreciated, as they become better understood by reference to the following detailed description when considered in connection with the accompanying drawings:

FIG. 3A is a flowchart illustrating steps for providing conditional access to in-game virtual items to players of a video game, in accordance with an embodiment of the present specification;

FIG. 4C illustrates an exemplary tabular data structure for recording attributes of in-game virtual items, in accordance with an embodiment of the present specification;

DETAILED DESCRIPTION

Figure 1:
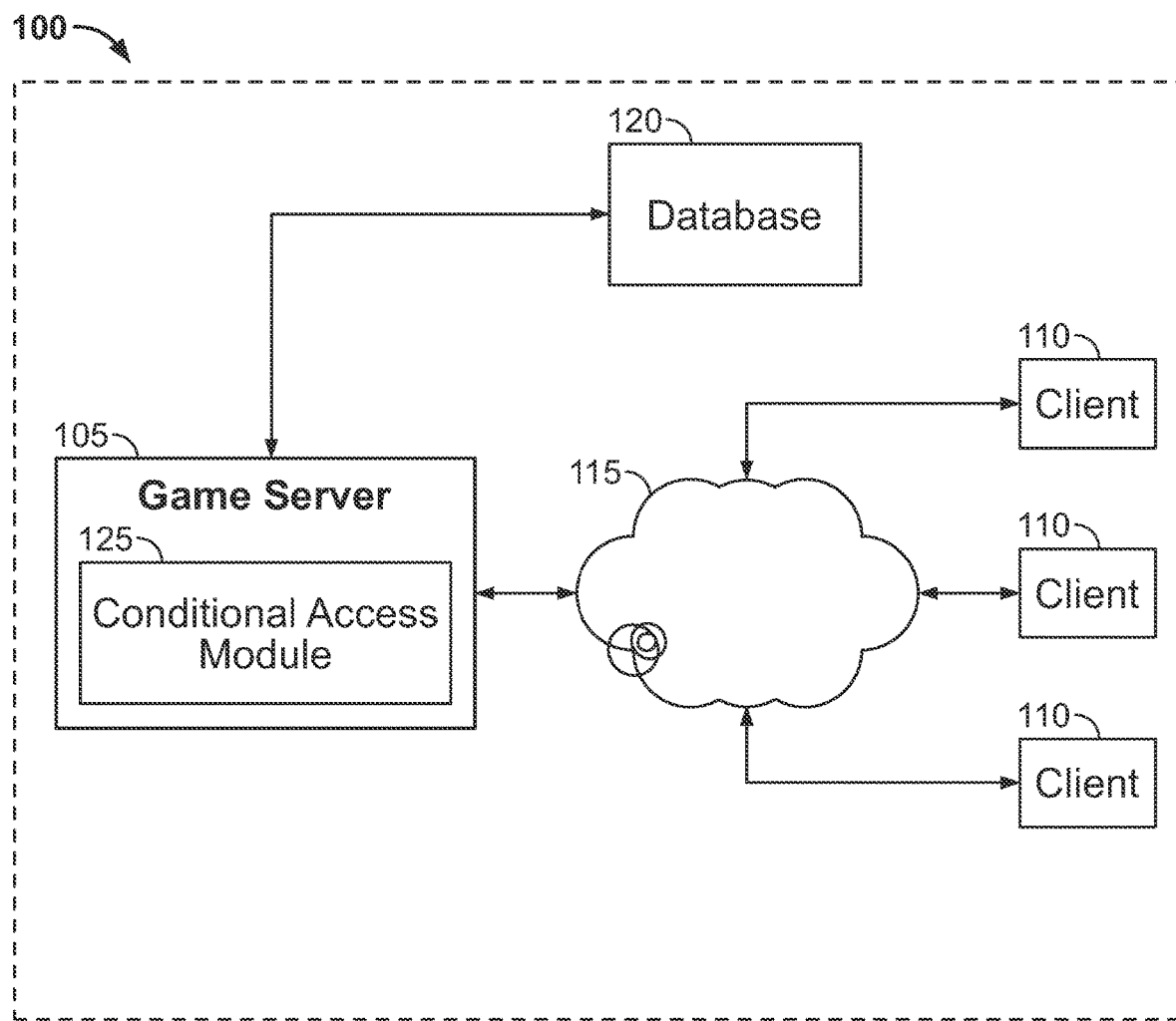
FIG. 1 illustrates an architecture of a gaming system in which methods of providing players with conditional access to virtual items may be implemented, in accordance with an embodiment of the present specification.

In various embodiments the present specification provides players of a video game conditional access to a set of predefined in-game virtual items that may enhance the player's gameplay experience. In an embodiment, a first player possessing a virtual item may make said item conditionally accessible to a second player, wherein the conditional accessibility is determined based on at least one predefined condition.

While aspects of the present specification may be described herein with reference to particular types of video game genres, the system and method described in detail herein may be used in any genre of single or multiplayer video games.

The present specification is directed towards multiple embodiments. The following disclosure is provided in order to enable a person having ordinary skill in the art to practice the invention. Language used in this specification should not be interpreted as a general disavowal of any one specific embodiment or used to limit the claims beyond the meaning of the terms used therein. The general principles defined herein may be applied to other embodiments and applications without departing from the spirit and scope of the invention. Also, the terminology and phraseology used is for the purpose of describing exemplary embodiments and should not be considered limiting. Thus, the present invention is to be accorded the widest scope encompassing numerous alternatives, modifications and equivalents consistent with the principles and features disclosed. For purpose of clarity, details relating to technical material that is known in the technical fields related to the invention have not been described in detail so as not to unnecessarily obscure the present invention.

In the description and claims of the application, each of the words "comprise" "include" and "have", and forms thereof, are not necessarily limited to members in a list with which the words may be associated. It should be noted herein that any feature or component described in association with a specific embodiment may be used and implemented with any other embodiment unless clearly indicated otherwise.

It should be appreciated that the term 'module' refers to computer logic utilized to provide a desired functionality, service or operation. In various embodiments, a module can be implemented in hardware, firmware and/or software controlling a general purpose processor. In one embodiment, the modules are programmatic codes or computer executable instructions stored on a storage system, such as the game database system, and executed by a processor.

As used herein, the indefinite articles "a" and "an" mean "at least one" or "one or more" unless the context clearly dictates otherwise.

The term "plurality of programmatically separate video games" means more than one video game where each of the video games comprises one or more separate executable files and can be fully played and engaged with independent of any other video game. The disclosed inventions are directed to an improvement in computer-related technology, namely providing players with conditional access to virtual items. In particular, the present specification discloses specific teachings regarding how players may be provided with conditional access to virtual items among other teachings. Accordingly, Applicant's claimed inventions do not preempt all approaches to managing the relations between parties and, instead, are directed to an improvement in video gaming technology grounded firmly in a specific way of achieving the desired outcome of allowing conditional access to the players of a video game of an in-game virtual item.

To the extent the claimed inventions are still considered to be "abstract" in nature, it should be appreciated that each of the claim limitations, when viewed as an ordered combination, amount to significantly more than just an abstract idea or concept. The methods and systems of the present invention represent technical improvements to a form of computer technology, video games, by providing a specialized computer system configured to host a plurality of concurrently executing video game streaming applications (for example, anywhere from at least 10 video game streaming applications to at least 100,000,000 video game streaming applications or any increment therein), host a plurality of client devices associated with remotely located players (for example, anywhere from at least 10 client devices associated with players to at least 100,000,000 client devices associated with players, or any increment therein), and perform a series of programmatic steps designed to generate electronic user interfaces that present a plurality of scenarios for providing players with conditional access to virtual items.

The presently disclosed embodiments are directed to methods for providing conditional access to a virtual gaming item that is allocated to a first player of a video game, wherein the video game represents one of a plurality of different instances of video game applications which are concurrently hosted by at least one server and wherein the plurality of different instances are greater than 10, as disclosed above.

FIG. 1 illustrates a gaming system 100 in which a method of making virtual items conditionally available to players may be implemented, in accordance with an embodiment of the present specification. The system 100 comprises a client-server architecture, where one or more game servers 105 are in communication with one or more remotely located client devices 110 over a network 115. Users may access the system 100 via the client devices 110 that may include, but not be limited to, personal or desktop computers, laptops, Netbooks, handheld devices such as smartphones, tablets, and PDAs, gaming consoles and/or any other computing platform known to persons of ordinary skill in the art. Although three client devices 110 are illustrated in FIG. 1, any number of client devices 110 can be in communication with the one or more game servers 105 over the network 115. The game server 105 is responsible for hosting, running, or executing a video game, and the remotely located client devices 110 are configured to execute an instance of the video game.

The video game may be from any video game genre. Video game genres include 1) action games, such as platform, shooter, fighting, stealth, survival, and rhythm games, 2) action-adventure games, such as survival horror or metroidvania games, 3) adventure games, such as text, graphic, visual, interactive or real-time 3D adventures, 4) role-playing games, such as action RPG, MMORPG, Roguelikes, tactical RPG, sandbox RPG, first-person party-based RPG, cultural differences, choices, or fantasy games, 5) simulation games, construction and management simulation, life simulation, or vehicle simulation games, 6) strategy games, such as 4X, artillery, real-time strategy, real-time tactics, multiplayer online baffle arena, tower defense, turn based strategy, turn based tactics, wargame, or grand strategy games, 7) sports games, such as racing, competitive, basketball, football, baseball, soccer, hockey, or sports-based fighting, or 8) the following other genres: MMO, casual, party, programming, logic, trivia, board, card, advergame, art, or educational.

The one or more game servers 105 can be any computing device having one or more processors and one or more computer-readable storage media such as RAM, hard disk or any other optical or magnetic media. The one or more game servers 105 include a plurality of hardware, software, and/or firmware components operating together to provide or implement a plurality of functional, operational or service-oriented modules. In some embodiments, the one or more game servers 105 include or are in communication with a game database 120. In one embodiment, each game server is associated with a separate game database system. In another embodiment, a common database may serve two or more game servers. The game database 120 stores a plurality of game data associated with one or more games that are served or provided to the client devices 110 over the network 115. In one embodiment, the game database system 120 a plurality of databases, each storing a different kind of data. In some embodiments, the one or more game servers 105 may be implemented by a cloud of computing platforms operating together as game servers. In embodiments, a game server is another home console, a personal computing device, such as a laptop or tablet PC, or a dedicated server.

In an embodiment, the game server 105 comprises a conditional access module 125 which is coupled to and in communication with the database 120. The conditional access module 125 is configured 1) to cause a set of predefined virtual in-game items associated with a first set of one or more players to be conditionally available to, and therefore shareable with, a second set of one or more players based upon the fulfillment of one or more predefined conditions or "triggers", 2) if a virtual in-game item is made conditionally accessible, to broadcast or generally notify the second set of one or more players of the potential availability of the virtual in-game item, 3) to receive, track and enforce rules for actually conditionally sharing a specific in-game item with at least one of the second set of one or more players, 4) based upon actions taken by the at least one of the second set of one or more players, conditionally sharing the virtual in-game item with that player and modifying the associated data structures accordingly, and 5) after the conditions associated with access of the virtual in-game item terminates, causing the virtual in-game item to no longer be accessible to that player and modifying the associated data structures accordingly.

In some embodiments, predefined conditions may need to be fulfilled before an item may be made available for conditional access. In some embodiments, the predefined conditions for conditional access are determined by the system on a per game basis and stored in a data structure. In embodiments, conditional accessibility to a virtual item may not be enabled until a certain percentage of the item has been obtained by the total player population playing the video game. For example, an owner of a first item may not be allowed to make the item available for conditional access until a predefined percentage of the item has been spawned by the game and collected by the player population. In other examples, conditional accessibility of a virtual item to a second player may not be enabled unless the item has a predefined rarity level. In other embodiments, accessibility to a virtual item may only be enabled during promotional periods, such as a holiday. In some embodiments, the predetermined conditions for conditional access may include player attributes. For example, conditional access to a virtual item may not be enabled unless: a) a second player has attained a particular experience level; b) a second player has a predefined number of points/treasure; or c) a second player has or does not have a related item. In some embodiments, the predefined conditions for access are determined by the owner of the item. In an embodiment the owner is enabled to define the conditions that must be fulfilled by players seeking access to the item. Such conditions may be, but are not limited to, said players having cleared predefined levels of the game, said players being first time players, said players having certain characteristics predefined as preferable by the owner, and other such conditions as deemed fit by the owner. In various embodiments, the owner may be allowed to define conditions for accessing the item, either additionally or alternatively to developer-specified conditions. In other embodiments, multiple other conditions may be predefined, which are required to be fulfilled before an item may be made available for access.

In an embodiment, the owner of the item is incentivized for sharing the item with other players. In embodiments, the incentives may include additional game points, enhancements for the in-game experience or other in-game benefits. In embodiments, the person who conditionally accesses the item may earn experience points for accessing or using the item. It should be noted that access conditions may increase the value and desirability of the items, thus incentivizing player engagement and enhancing the entertainment value for the players trying to obtain access to said items.

In an embodiment, the database 120 stores a data structure such as, but not limited to, a table comprising a list of in-game virtual items available for sharing along with the corresponding owners of said items. The data structure may also comprise a time duration for which each of said items may be made available to other players and a corresponding condition which is required to be fulfilled before said item may be made available. In various embodiments, the conditional access module 125 manages the database and updates the inventories of the owner of a virtual item as well as the player to whom the virtual item has been made conditionally available. In various embodiments, each virtual item has a unique product identification code (ID) and each player has a unique gamer ID. When the item is owned by a player, the item's product ID is added to the player's gamer ID. In an embodiment, the conditional access module 125 removes the item's ID from an owner's gamer ID when conditional access to said item is provided to a second player, adds the item's product ID to the second player's gamer ID for a predefined period of time; and upon expiration of said time automatically transfers the item's ID back to the owner's gamer ID. This enables seamless tracking of the virtual item. In an embodiment, each virtual item may also have, associated with it, player reward amounts and the costs associated with conditional access.

Figure 2:
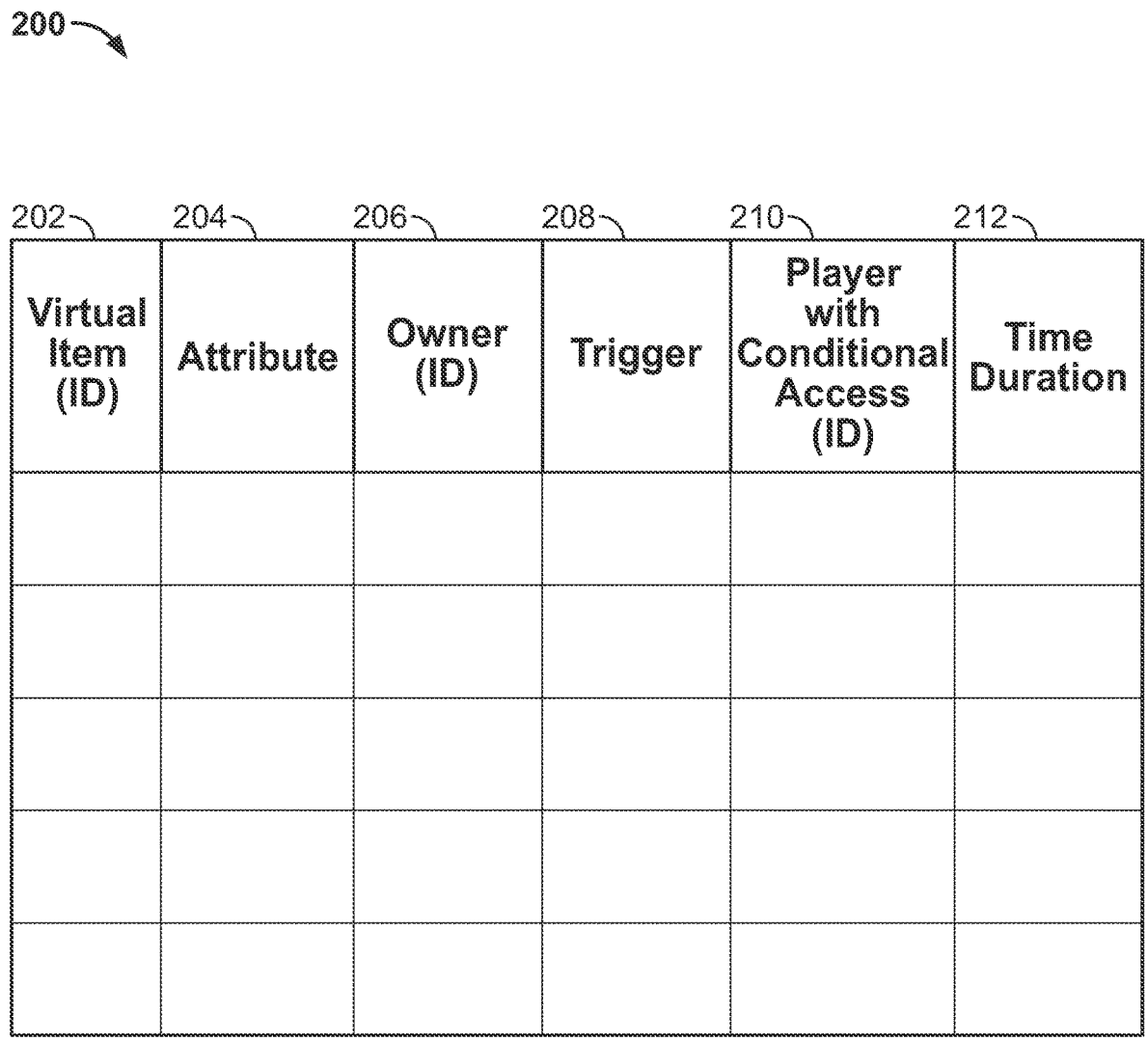
FIG. 2 illustrates an exemplary data structure for managing and tracking ownership and conditional access of in-game virtual items, in accordance with an embodiment of the present specification.

FIG. 2 illustrates an exemplary tabular data structure for recording ownership of in-game virtual items, in accordance with an embodiment of the present specification. Table 200 comprises a column 202 for storing metadata or identification codes (IDs) of virtual items, a column 204 for storing corresponding attributes of said items, a column 206 for storing IDs of corresponding owners of the virtual items, a column 208 for storing availability triggers/conditions or a field for encoding availability options corresponding to the items upon fulfillment of which said items may be temporarily used by other players, a column 210 for storing IDs of players temporarily allowed to access the virtual items upon fulfillment of trigger conditions, and a column 212 for storing time durations for which each of said items may be temporarily accessed. It would be apparent that table 200 is just one way of storing the information relating to the virtual items and their accessibility. In an embodiment, table 200 also comprises a column (not shown in FIG. 2) to store an incentive/reward given to an owner for sharing an item with other players, corresponding to each virtual item stored in column 202. In various embodiments various other data structures may be used to record said information. Referring to FIGS. 1 and 2, conditional access module 125 of server 105 is coupled with table 200 stored in database 120, and manages providing conditional accessibility of the stored virtual items to players.

FIG. 3A is a flowchart illustrating the steps of making an in-game virtual item in a video game conditionally available to players of the game, in accordance with an embodiment of the present specification. At step 302, a database of virtual items, owned by at least one first player, that are conditionally accessible to at least one second player is generated, wherein the accessibility is determined based on at least one predefined condition, as described above. In embodiments, virtual items are only shown to those second players that qualify to conditionally access the item.

At step 304, an attribute of an in-game virtual item owned by a first player is modified in order to make other players of a video game aware that said item may be made conditionally available to one or more of said players for a predefined period of time. In embodiments, a color of said item may be changed to a predefined color, or said item made be made to glow or a predefined mark may be clipped on to the item, or special effects (SFX), visual special effects, particle effects may be added to the item. In an embodiment, attributes of the item which affect the attributes of the in-game player character and/or the in-game player character weapons and other ways to earn experience/points within the game by using the item may also be highlighted/advertised. In other embodiments, the owner of the item may make announcements or advertisements to inform other players of the conditional availability of the item. In embodiments a descriptor advertising item availability along with predefined fulfillment condition(s) may be added to the items description. In an embodiment, said item may be marked as available for a predefined period of time in an inventory of the player owning the item. In other embodiment, said item may be added to a list of items available for conditional use, wherein the list can be accessed by all the players of the video game.

At step 306, at least one second player fulfills at least one access condition in order to trigger or enable their access and obtain said item for said period of time. In some embodiments an access condition may comprise, but is not limited to, payment of an amount of money/in-game currency in order to obtain the item for a predefined period of time. In an embodiment, the amount of money is established by the game developer. In an embodiment, the amount of money may be set by the owner of the virtual item, who may provide limited time offers as well as other advanced pricing options for accessing the item. In some embodiments, the amount of money that is charged for a virtual item is system-controlled via in-game menus for price-setting and placing said items in a marketplace. In some embodiments, the marketplace may be part of the outside game world. In some embodiments, the marketplace may be an in-game feature and part of the virtual world, such as a virtual merchant's shop. In an embodiment, the system may provide an environment for setting up an auction for accessing the item, when the item is coveted by more than one players; wherein a minimum bid, a reserve price, and a buyout price may be predefined by the system or dynamically controlled by the owner.

At step 308, the item is made accessible to the one or more players that have fulfilled said conditions for the predefined period of time. In an embodiment, during said period the item is not available for use to the first player (owner of said item). When the item is owned by a player, the item's product ID is coupled with the player's gamer ID. In an embodiment, when conditional access to said item is provided to a second player, the item's ID is removed from the owner's gamer ID and is coupled with the second player's gamer ID for the predefined period of time. Upon expiration of the predefined period of time, the item's ID is automatically transferred back to the owner's gamer ID.

At step 310, the inventories of the first player and said one or more players are modified to reflect said accessibility of the item for the limited time duration. In embodiments, a player's inventory items are stored in a database structure and linked to the player's profile via a reference embedded in an associated cell. In embodiments, changes are made in said inventory data structure of the first player to indicate that the item is no longer available for use by the first player. In embodiments, changes are made in the inventory data structure of the second player to whom the item has been made accessible indicating that the item is possessed by the second player for the predefined time period.

At step 312, it is determined if the time period has elapsed, and if the time has not elapsed the game proceeds as before at step 316. In an embodiment, a first current time when the one or more players are provided access to the item is recorded and is continuously compared with a current time to determine if the predefined period has elapsed. Lapse of the predefined period occurs when a difference between a current time and the recorded first current time becomes equal to the predefined period of time. In one embodiment, the determination of the elapsed time period is effectuated by using a system countdown timer tied with the item's product ID. In various embodiments, the system countdown timer is based on Coordinated Universal Time (UTC).

At step 313, if said time period has elapsed, the accessibility of the item is withdrawn from the one or more players. At step 314 the inventories of the first player and said one or more players are modified to reflect said withdrawn accessibility.

In an embodiment, the method of providing conditional access to virtual items may be implemented by using a block chain technique. In an embodiment, when a conditional access to an item is provided to a player, the event is published to a ledger via block chain technology so that said event is available to all the players of the game. In an embodiment, instead of storing the events in a centralized backend server, said events are stored on a distributed ledger system.

Figure 3B:
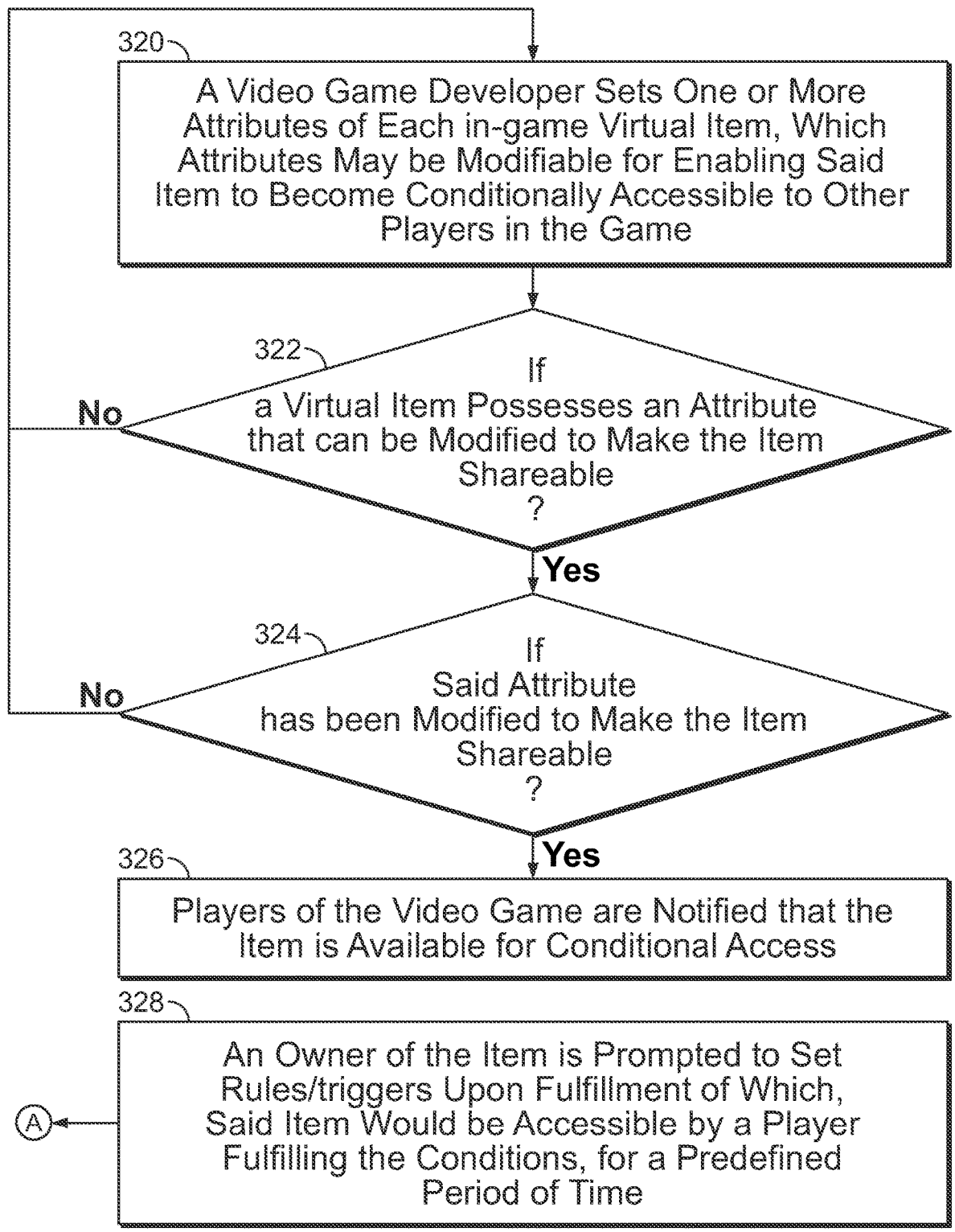
FIG. 3B is a flowchart illustrating the steps of making an in-game virtual item in a video game conditionally available to players of the game, in accordance with another embodiment of the present specification.
Figure 3B:
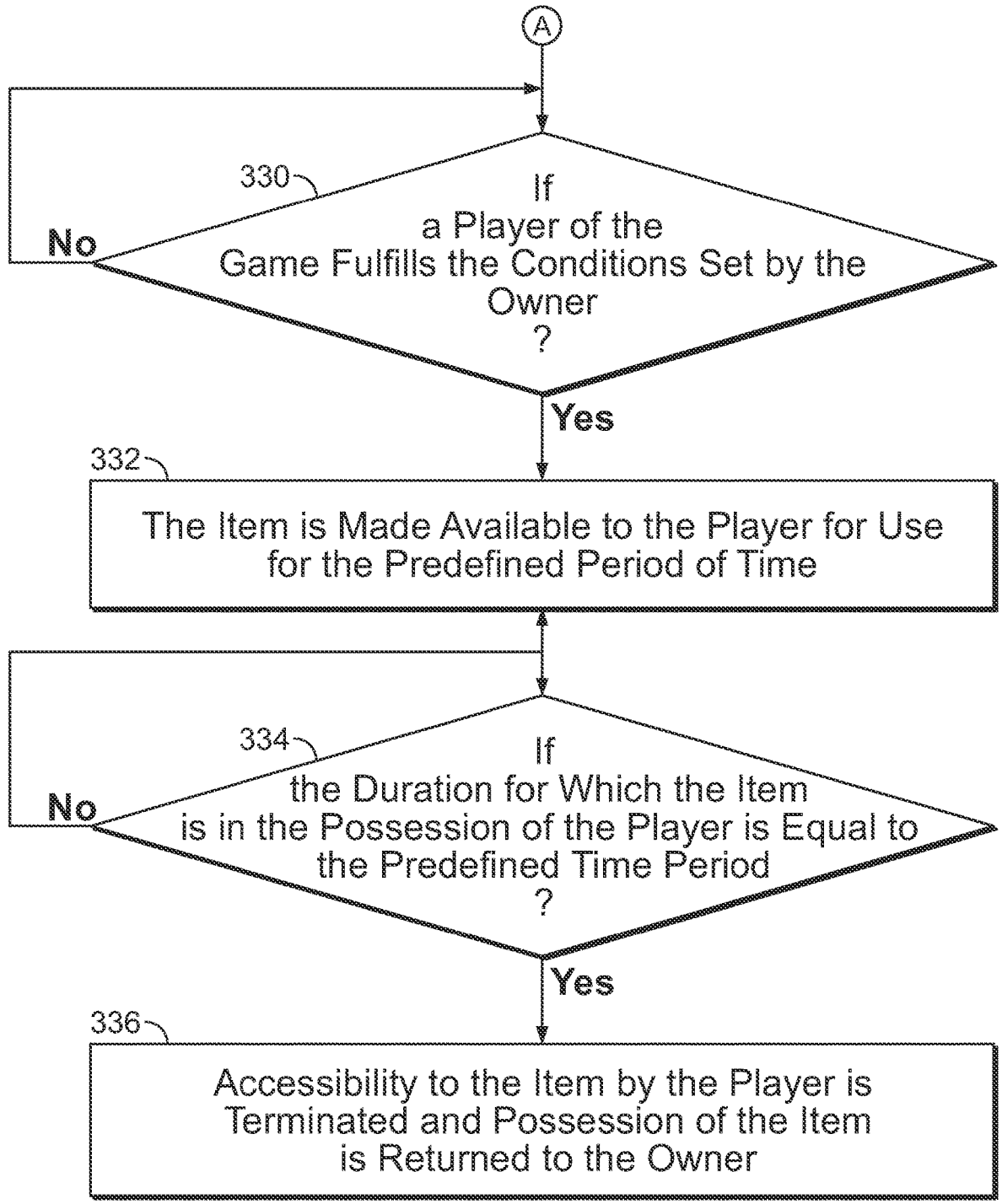

FIG. 3B is another flowchart illustrating the steps of making an in-game virtual item in a video game conditionally available to players of the game, in accordance with an embodiment of the present specification. At step 320, a video game developer (i.e. the entity responsible for managing the game servers, gaming code, and other technologies required to actually operate the game on-line), sets one or more attributes of each in-game virtual item. These attributes may be modified by the developer to either make each item shareable or non-shareable. In an embodiment, an owner of the item may be enabled to modify one or more predefined attributes of the item based upon predefined conditions defined by the developer.

At step 322 it is determined if a virtual item possesses an attribute that can be modified to make the item shareable. At step 324 if the item possesses an attribute that can be modified to make the item shareable, it is determined if said attribute has been modified to make the item shareable. At step 326 if the attribute has been modified to make the item shareable, players of the video game are notified that the item is available for conditional access. At step 328, an owner of the item is prompted to set rules/triggers upon fulfillment of which, said item would be accessible by a player fulfilling the conditions, for a predefined period of time. At step 330 it is determined if a player of the game fulfills the conditions set by the owner of the virtual item. At step 332, if the conditions are fulfilled by the player, the item is made available to the player for use for the predefined period of time. At step 334, it is determined if the duration for which the item is in the possession of the player is equal to the predefined time period. At step 336, if the duration is equal to the predefined time period, accessibility to the item by the player is terminated and possession of the item is returned to the owner. Each step of FIG. 3B is explained in detail with respect to FIGS. 4A, 4B, 4C, 5A, 5B, 6A, 6B, 7A, 7B, 8A and 8B.

Figure 4A:
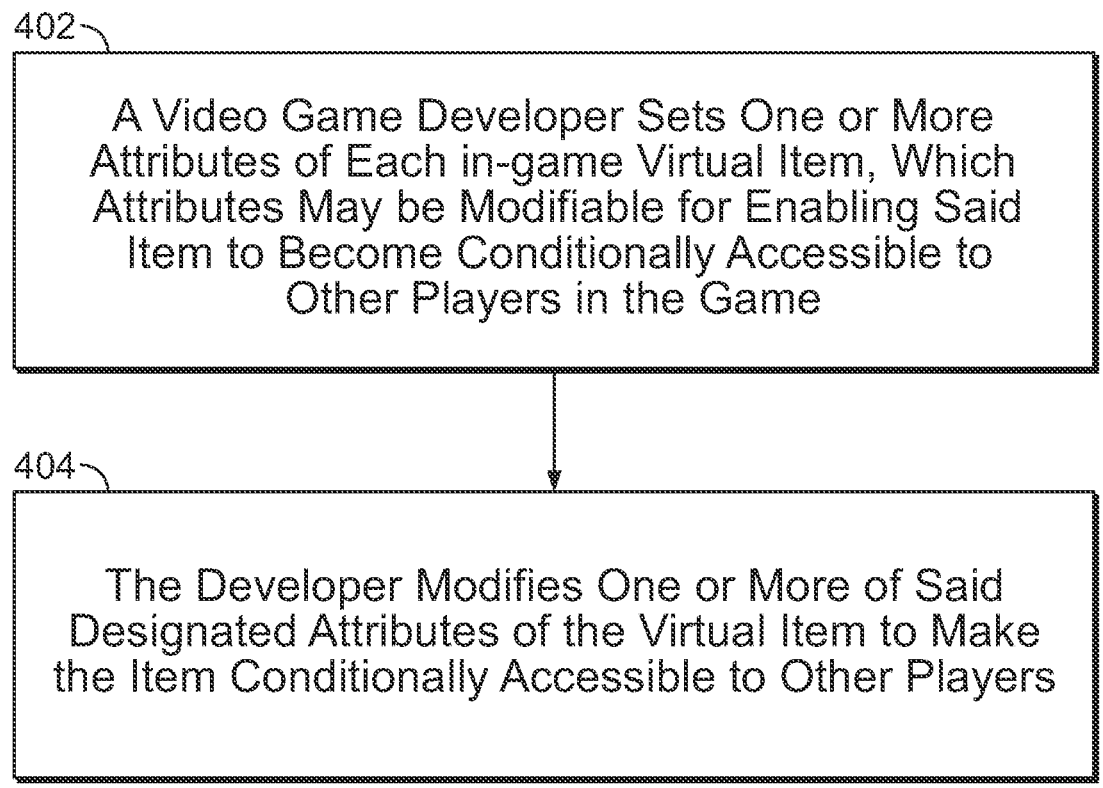
FIG. 4A is a flowchart illustrating the steps of designating one or more attributes of an in-game item that may be modified for causing the item to be conditionally accessible, in accordance with an embodiment of the present specification.

FIG. 4A is a flowchart illustrating the steps of designating one or more attributes of an in-game item that may be modified for causing the item to be conditionally accessible, in accordance with an embodiment of the present specification. In various embodiments, at step 402 a video game developer (i.e. the entity responsible for managing the game servers, gaming code, and other technologies required to actually operate the game on-line), sets one or more attributes of each in-game virtual item. In embodiments, the attributes may be modifiable to enable said item to become conditionally accessible to other players in the game. In other embodiments, the attributes may be modifiable by an owner of the item in the game to enable said item to become conditionally accessible to other players in the game. In various embodiments, these attributes are not player specific and apply generally to the in-game item itself. At step 404, the developer modifies one or more of said designated attributes to make the item conditionally available or accessible to players other than the owner of the virtual item. For example, for a virtual weapon being used in the game, one or more attributes may be designated by the game developer as modifiable to make the weapon conditionally available to other players. The developer of the weapon can make that weapon shareable, by modifying the one or more attributes such as, but not limited to, shareable on an upcoming weekend, shareable if the owner has passed a particular level, etc. In an embodiment, a color of said item may be changed to a predefined color, or said item made be made to glow or a predefined mark may be clipped on to the item. In embodiments a descriptor attribute of an item advertising item availability along with predefined fulfillment condition(s) may be designated as modifiable by the developer. In an embodiment, said item may be marked as shareable for a predefined period of time in an inventory of the player owning the item.

Figure 4B:
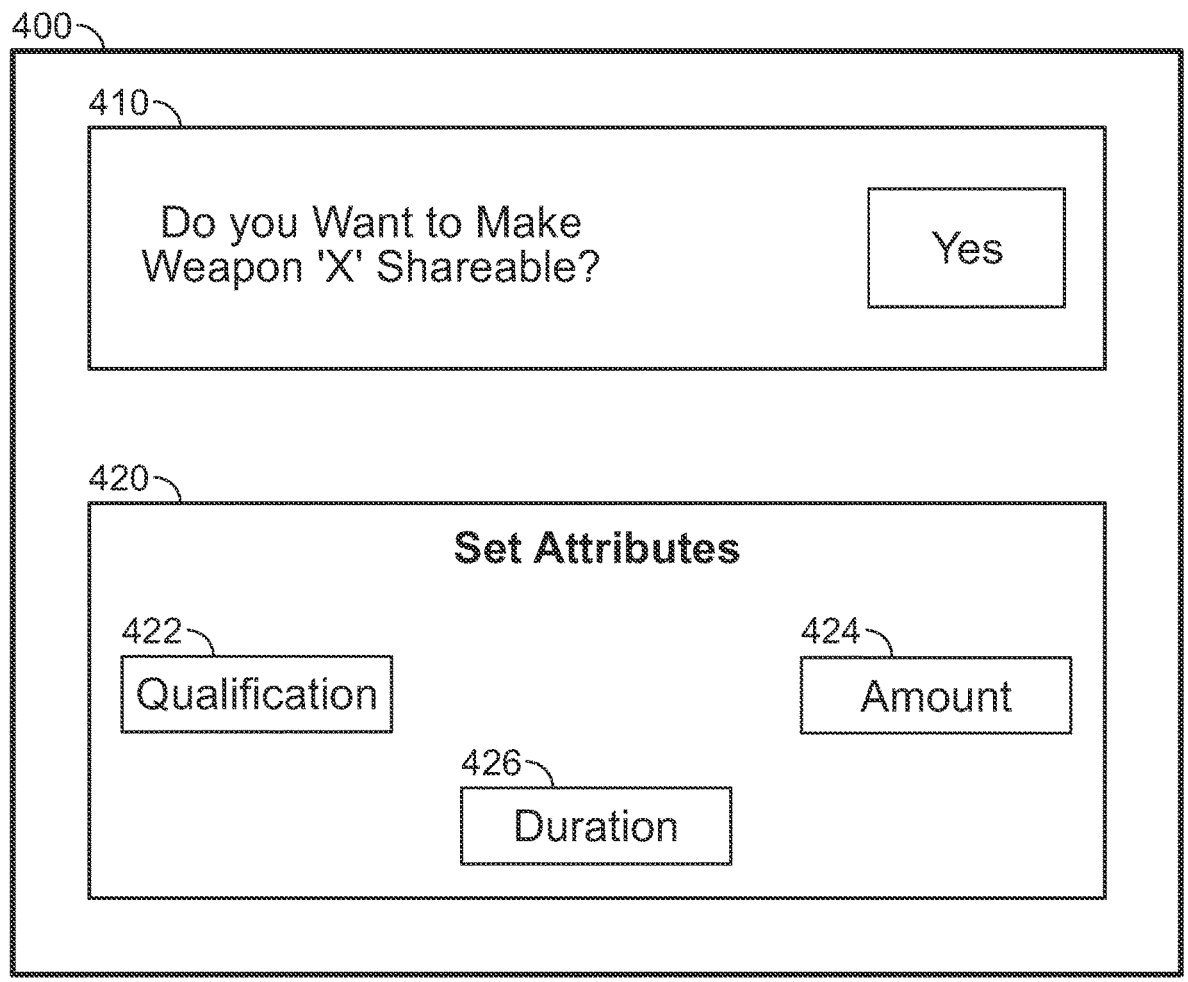
FIG. 4B is an exemplary GUI for setting one or more attributes of an in-game item for causing the item to be conditionally accessible, in accordance with an embodiment of the present specification.

FIG. 4B is an exemplary GUI for setting one or more attributes of an in-game item for causing the item to be conditionally accessible, in accordance with an embodiment of the present specification. As shown a developer of a virtual item such as a particular weapon 'X' may be prompted to make the weapon shareable at 410, and may set attributes of the weapon defining the conditions and time period for conditional accessibility of the weapon. If the developer selects 'yes' at 410, the developer is prompted to set attributes at 420. In the example shown in FIG. 4B, the developer may set a qualification 422 of an accessing player such as for example, that the weapon would be temporarily accessible to other players only after the players have reached a predefined game level, and a minimum (and in some embodiments, a maximum) amount 424 which must be paid by an accessing player. The developer may also modify an attribute to set a minimum (and in some embodiments, a maximum) time period for which the weapon would be shareable at 426.

FIG. 4C illustrates an exemplary tabular data structure for recording attributes of in-game virtual items, in accordance with an embodiment of the present specification. Table 400 comprises a column 430 for storing metadata or identification codes (IDs) of virtual items, a column 432 for storing corresponding attributes of said items such as but not limited to: a time of availability of the item for sharing, a color change of the item showing that it is temporarily accessible, a change in the descriptor of the item showing that it is temporarily accessible, an amount of money payable for gaining access to the item, and a reward/incentive available to the owner of the item upon making the item conditionally accessible to other players.

Figure 5A:
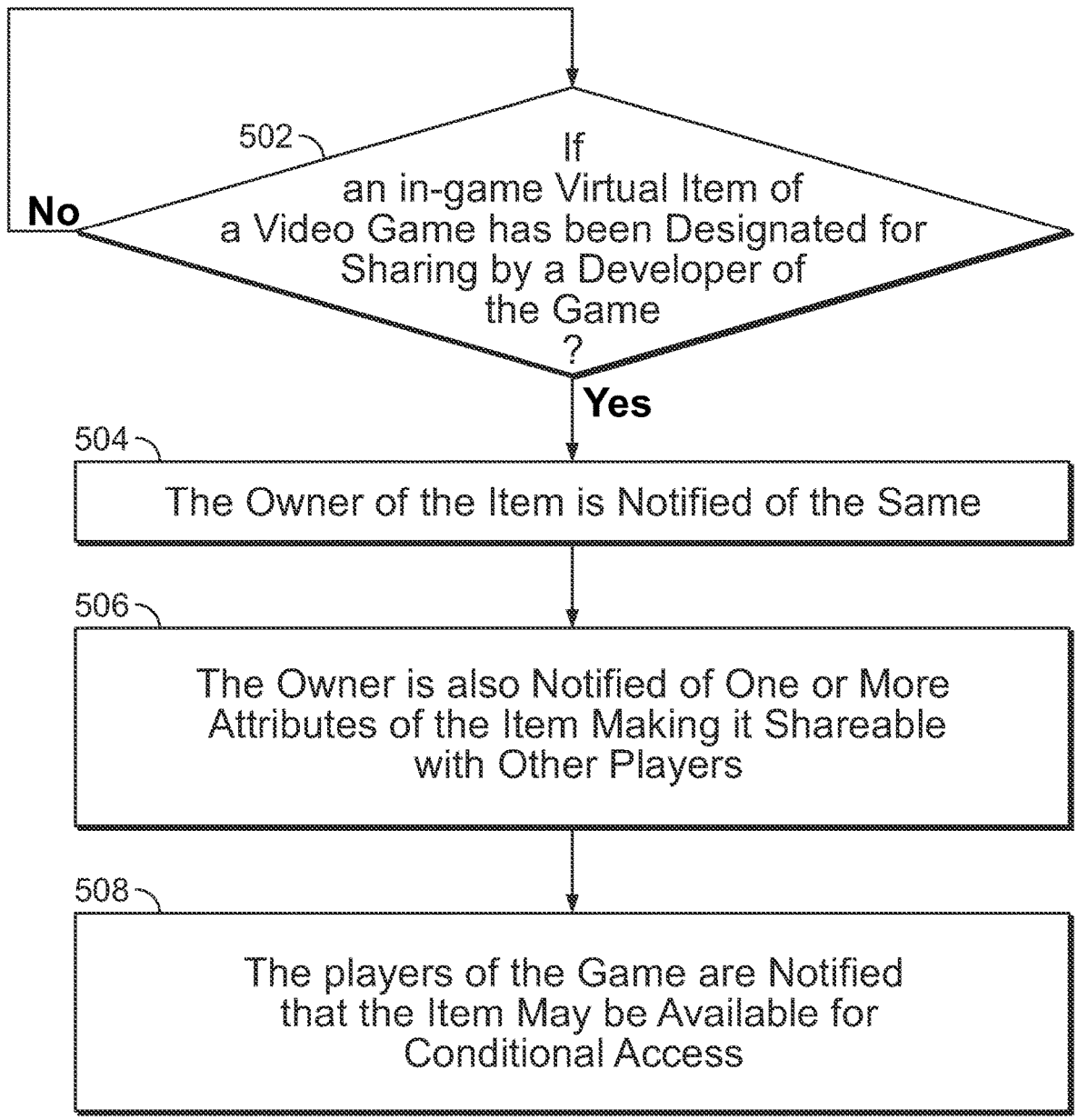
FIG. 5A is a flowchart illustrating the steps of notifying the players of a video game that an in-game virtual item is conditionally accessible, in accordance with an embodiment of the present specification.

FIG. 5A is a flowchart illustrating the steps of notifying the players of a video game that an in-game virtual item is conditionally accessible, in accordance with an embodiment of the present specification. At step 502, it is determined if an in-game virtual item of a video game has been designated for sharing by a developer of the game. At step 504, if the item has been designated for sharing, the owner of the item is notified. In an embodiment, the owner is also notified of the one or more attributes of the item making it shareable with other players at step 506. For, example, if the item may be made conditionally available to other players only on weekends, the owner may be reminded via messages/pop-ups when a weekend arrives. The owner, as described with respect to FIGS. 6A and 6B, may set up rules/triggers for allowing conditional access to the players of a video game of an in-game virtual item. Once this is done, at step 508, the players of the game are notified that the item is available for conditional access. For example, a color of said item may be changed to a predefined color, or said item made be made to glow or a predefined mark may be clipped onto the item. In other embodiments, the owner of the item may make announcements or advertisements to inform other players of the conditional availability of the item. In some embodiments a descriptor advertising item availability along with predefined fulfillment condition(s) may be added to the items description. In other embodiments, said item may be added to a list of items available for conditional use, wherein the list can be accessed by all the players of the video game.

Figure 5B:
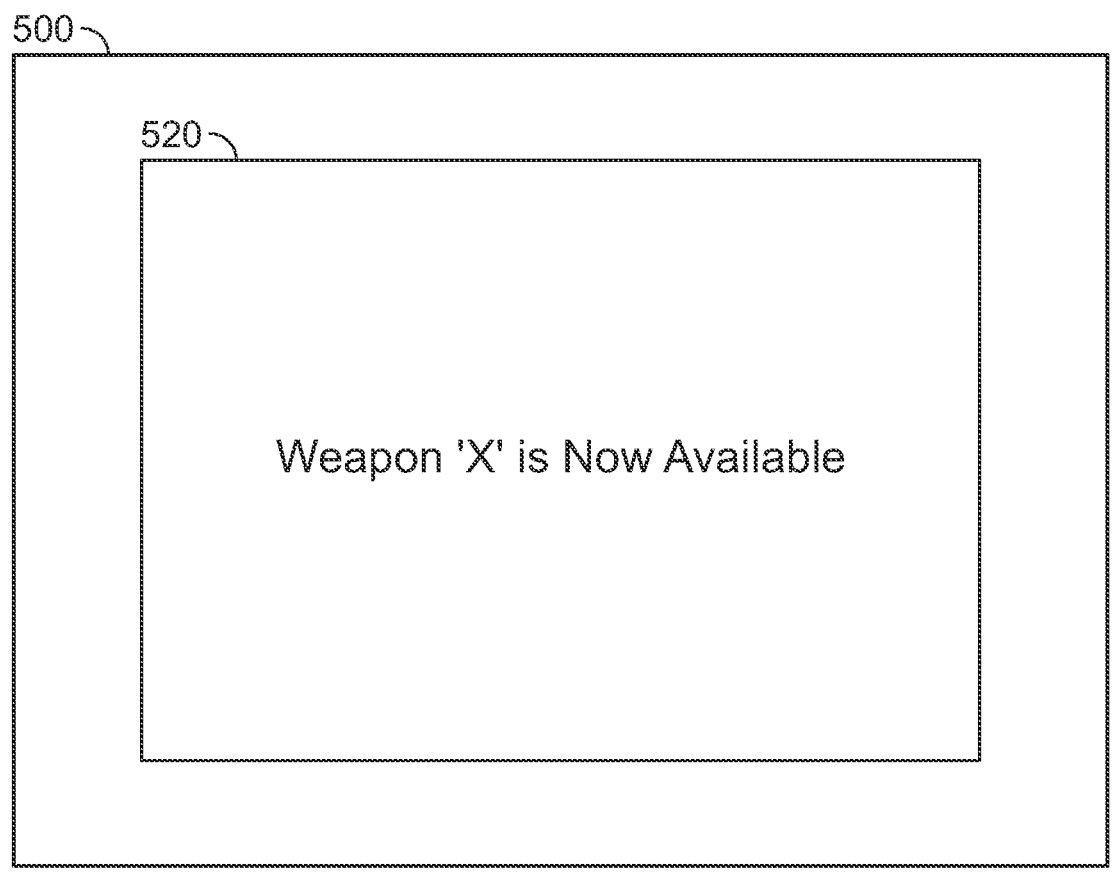
FIG. 5B is an exemplary GUI for notifying the players of a video game that at least one in-game virtual item is conditionally accessible, in accordance with an embodiment of the present specification.

FIG. 5B is an exemplary GUI for notifying the players of a video game that at least one in-game virtual item is conditionally accessible, in accordance with an embodiment of the present specification. As shown in screenshot 500 a pop-up message 520 informs the players that a weapon 'X' is now available.

Figure 6A:
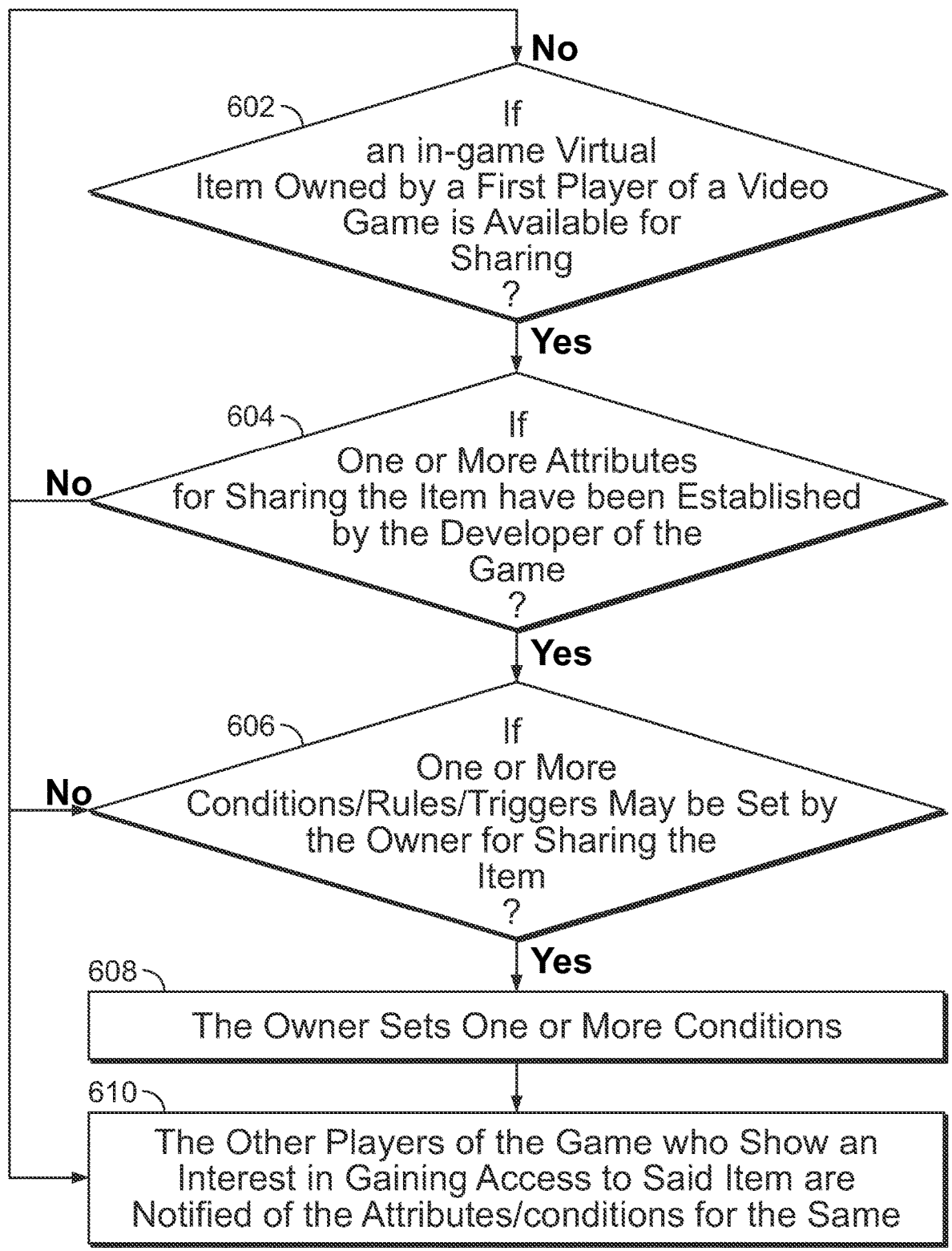
FIG. 6A is a flowchart illustrating the steps of setting up rules/triggers for allowing conditional access to the players of a video game of an in-game virtual item, in accordance with an embodiment of the present specification.

FIG. 6A is a flowchart illustrating the steps of setting up rules/triggers for allowing conditional access to the players of a video game of an in-game virtual item, in accordance with an embodiment of the present specification. At step 602 it is determined if an in-game virtual item owned by a first player of a video game is available for sharing. At step 604 if the item is available for sharing, it is determined if one or more attributes for sharing the item have been set by the developer of the game. In various embodiments, the developer may establish one or more prerequisites (as described above) for gaining conditional access to a virtual item. For example, a particular in game weapon may only be accessed by players who have achieved a particular level of the game. Other pre-conditions may comprise a minimum pre-defined amount of virtual money that must be paid to the owner for accessing the item or a predefined time minimum period for which the item may be accessed by the players. At step 606 if one or more attributes for sharing the item have been established by the developer of the game, it is determined if one or more conditions/rules/triggers may be set by the owner for sharing the item. At step 608, if one or more conditions/rules/triggers may be set by the owner for sharing the item, the owner may set one or more conditions. For example, the owner may set the amount of money payable for gaining access to the item, or set the time period for which the item would be accessible. The owner may also set desired pre-qualifications of players who would be granted temporary access to the item. At step 610, the other players of the game who show an interest in gaining access to said item are notified of the prerequisite conditions.

Figure 6B:
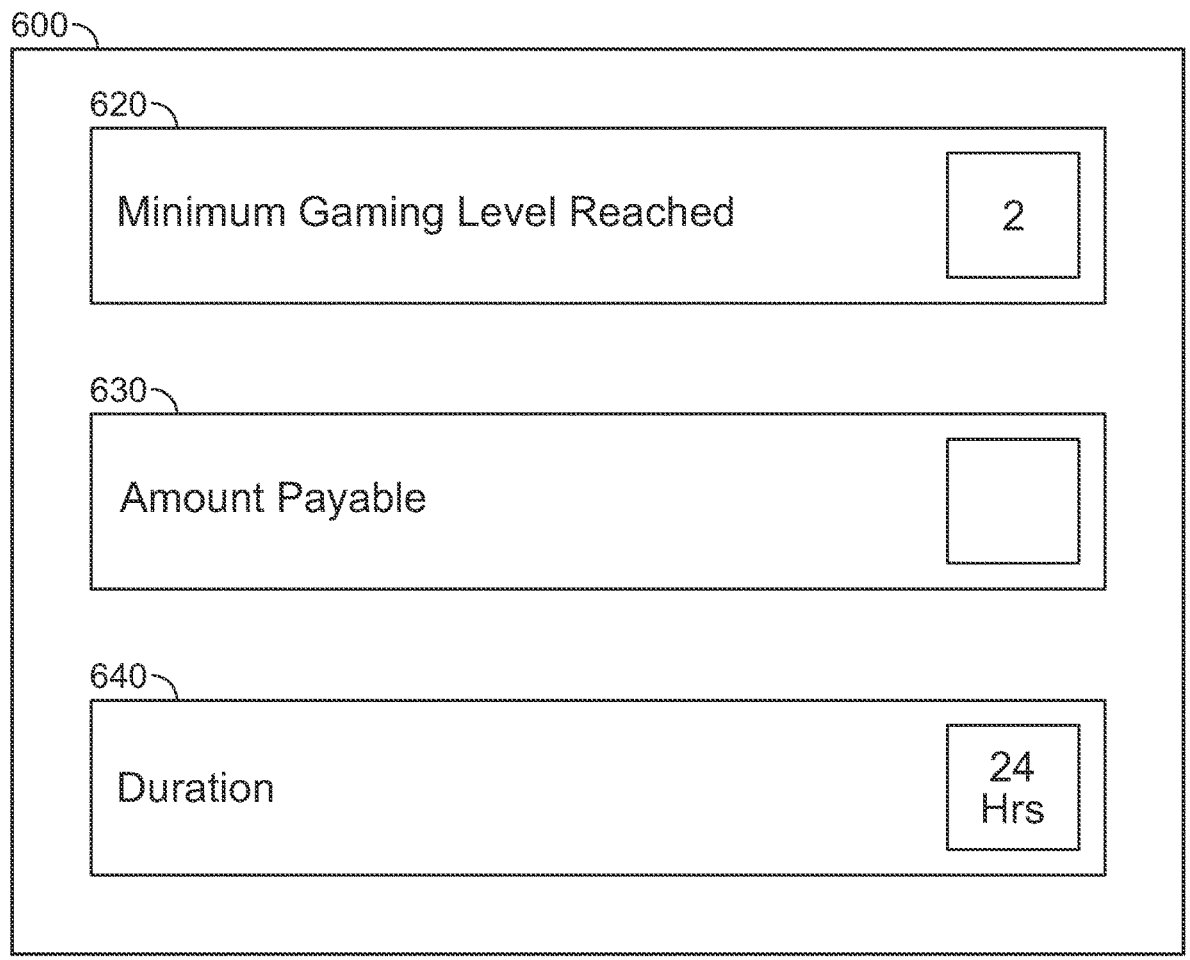
FIG. 6B is an exemplary GUI for setting up rules for gaining conditional access to an in-game virtual item by the owner of the item in a video game, in accordance with an embodiment of the present specification.

FIG. 6B is an exemplary GUI for setting up rules for providing conditional access to an in-game virtual item by the owner of the item in a video game, in accordance with an embodiment of the present specification. As shown in screenshot 600, at 620, 630 and 640 the owner can define a minimum game level reached by players who can be granted access, an amount of money payable for gaining access, and a time period for which the item would be accessible for said amount of money to the players who have reached said gaming level. In an embodiment, the owner may decline a request for making an item conditionally accessible to other players a predefined number of times. In another embodiment, the owner of the item may modify one or more predefined attributes of the item based upon predefined conditions defined by the developer of the game.

Figure 7A:
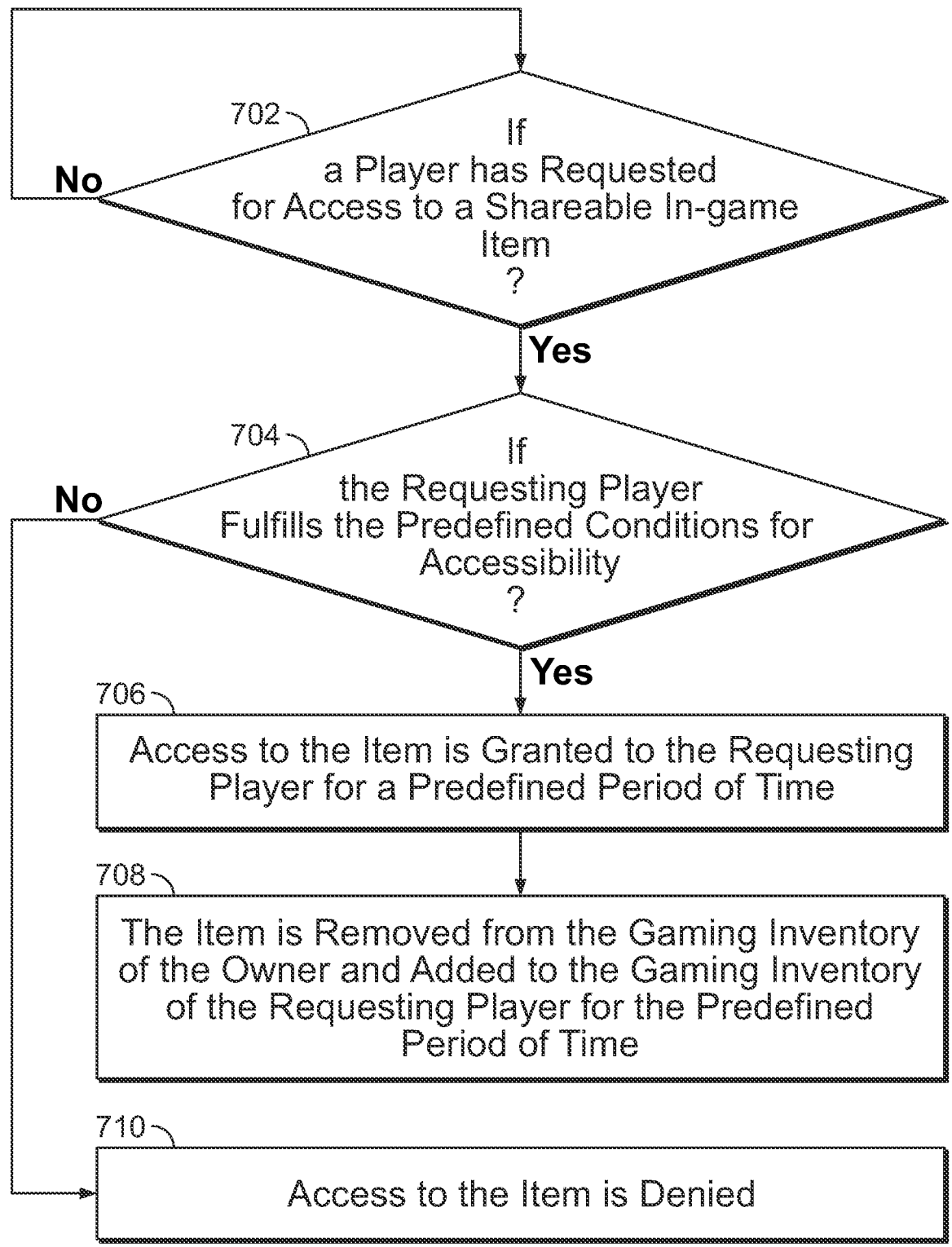
FIG. 7A is a flowchart illustrating the steps of allowing access to an in-game virtual item to one or more players upon fulfillment of one or more predefined conditions, in accordance with an embodiment of the present specification.

FIG. 7A is a flowchart illustrating the steps of allowing access to an in-game virtual item to one or more players upon fulfillment of one or more predefined conditions, in accordance with an embodiment of the present specification. In embodiments, once players are notified of the availability of an item for conditional access such as described above, one or more players may request access to the item from the owner. At step 702, it is determined if a player has requested conditional access to a virtual in-game item. The request may be made via an in-game chat window, via a broadcast message or via personal message to the owner or any other suitable method. At step 704 upon receiving a request for the item, it is determined by the owner if the requesting player fulfills the predefined conditions for accessibility. Some of said conditions have been described above with reference to FIG. 6A. If it is determined that the requesting player has fulfilled said conditions, then at step 706, access to the item may granted to the requesting player for a predefined period of time. At step 708, the item is removed from the gaming inventory of the owner and added to the gaming inventory of the requesting player for the predefined period of time. At step 710, if the conditions are not fulfilled by the requesting player, access to the item is denied.

Figure 7B:
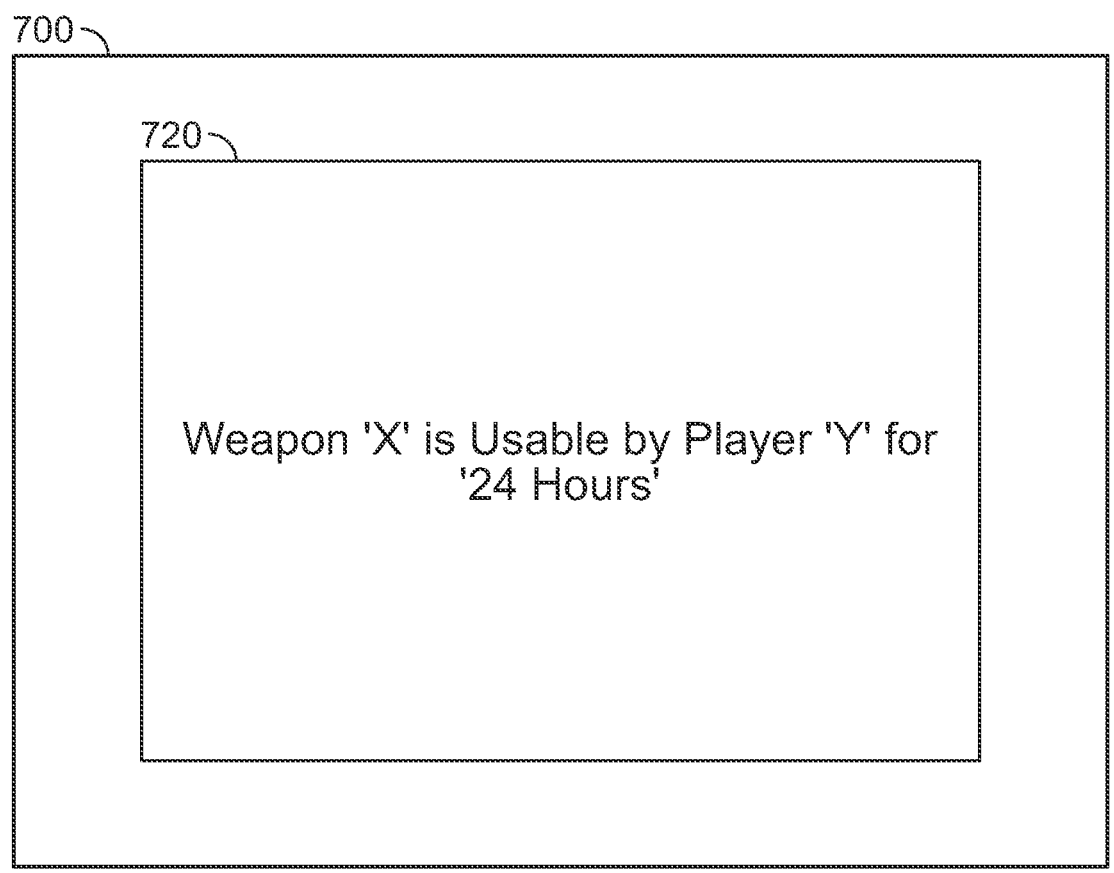
FIG. 7B is an exemplary GUI showing that an in-game item is accessible to a player of a video game who is not the owner of said item, in accordance with an embodiment of the present specification.

FIG. 7B is an exemplary GUI showing that an in-game item is accessible to a player of a video game who is not the owner of said item, in accordance with an embodiment of the present specification. As shown in screen shot 700, a notification 702 that a weapon 'X' is usable by a player 'Y' for a predefined time period such as '24 hours' is displayed to the players of the video game.

Figure 8A:
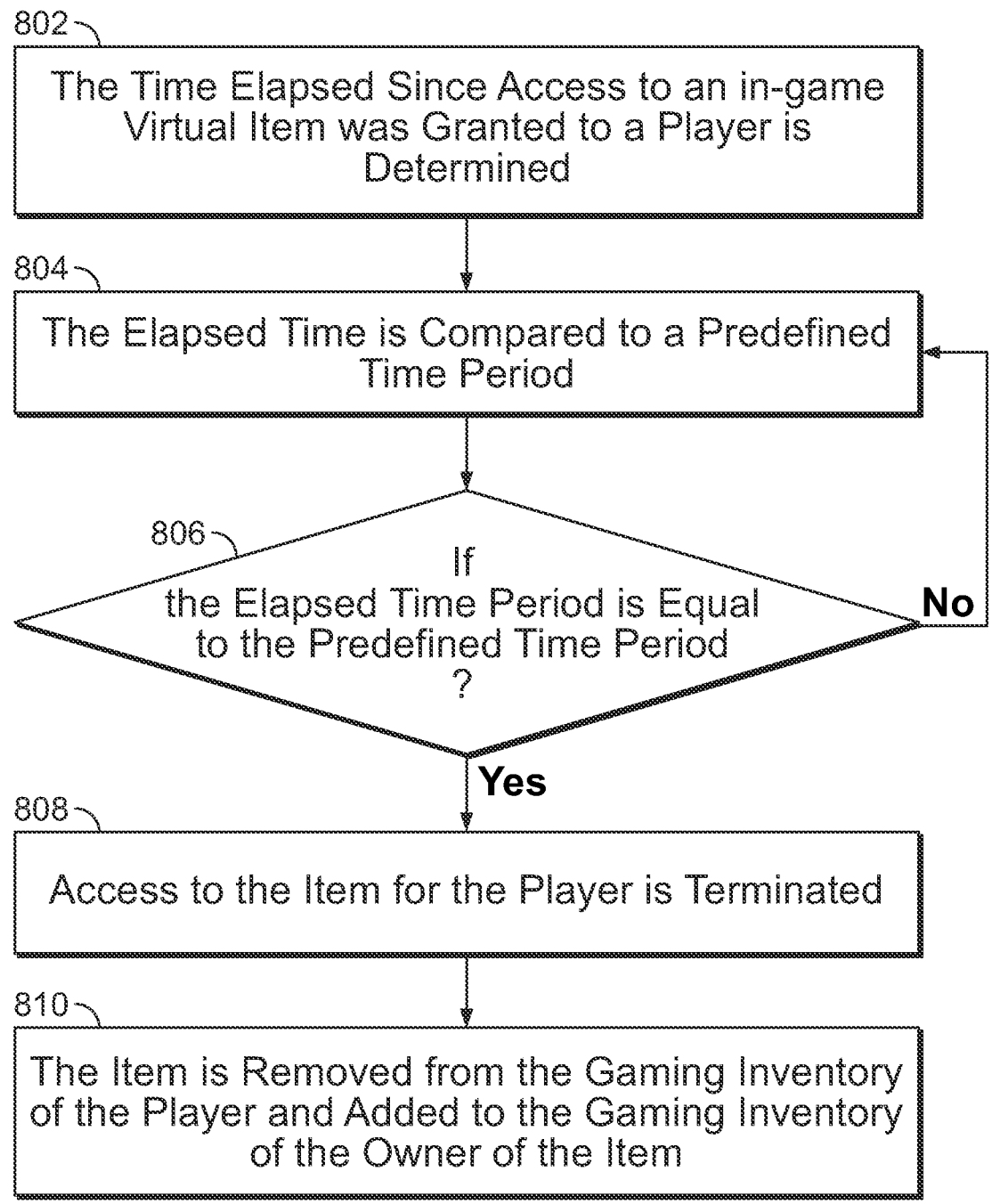
FIG. 8A is a flowchart illustrating the steps of terminating access to an in-game item after expiry of a predefined period, in accordance with an embodiment of the present specification.

FIG. 8A is a flowchart illustrating the steps of terminating access to an in-game item after the expiry of a predefined period, in accordance with an embodiment of the present specification. At step 802 it is determined how much time has elapsed since access to an in-game virtual item was granted to a player. At step 804 the elapsed time is compared to a predefined time period. At step 806 it is determined if the elapsed time period is equal to the predefined time period. At step 808, if the elapsed time period is equal to the predefined time period, access to the item is terminated. At step 810 the item is removed from the gaming inventory of the player and added back to the gaming inventory of the owner of the item.

Figure 8B:
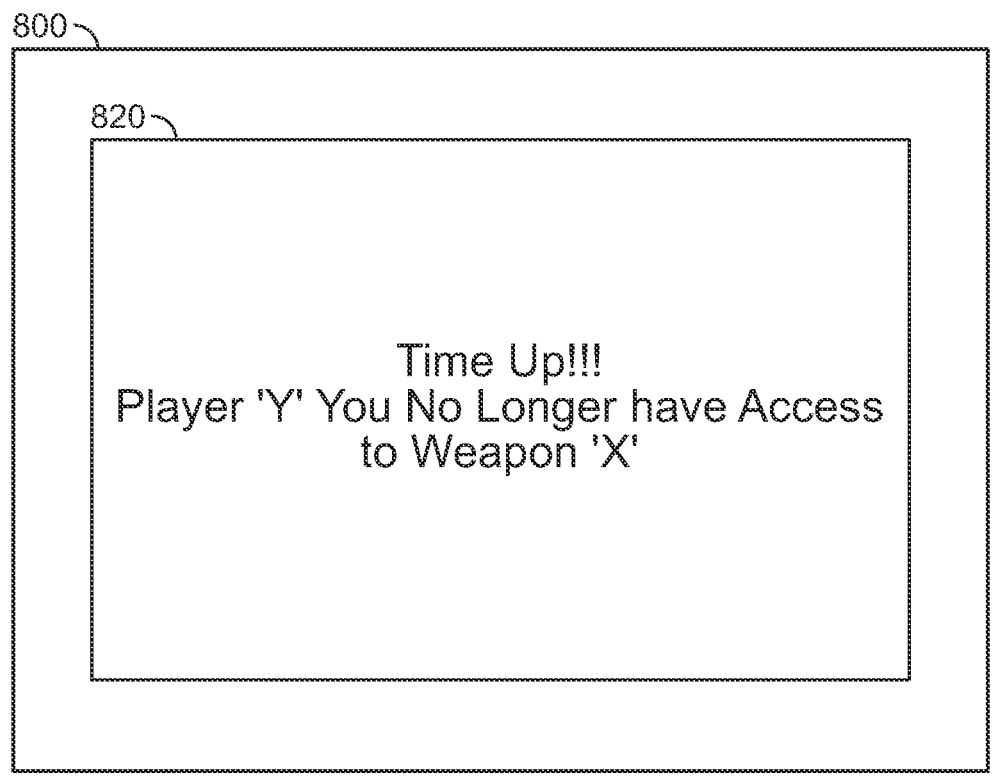
FIG. 8B is an exemplary GUI showing that access to an in-game item is terminated for a player of a video game who is not the owner of said item, in accordance with an embodiment of the present specification.

FIG. 8B is an exemplary GUI showing that access to an in-game item is terminated for a player of a video game who is not the owner of said item, in accordance with an embodiment of the present specification. As shown in screen shot 800, a notification 802 that a time period for accessing weapon 'X' by a player 'Y' has elapsed is displayed to the players of the video game.

The above examples are merely illustrative of the many applications of the system and method of present specification. Although only a few embodiments of the present specification have been described herein, it should be understood that the present specification might be embodied in many other specific forms without departing from the spirit or scope of the specification. Therefore, the present examples and embodiments are to be considered as illustrative and not restrictive, and the specification may be modified within the scope of the appended claims.

I claim:

1. A method for providing conditional access to a virtual gaming item that is allocated to a first player of a video game, wherein the video game is provided by a computer system comprising at least one server having a processor and configured to host a plurality of concurrently executing different instances of video game applications, host a plurality of client devices associated with remotely located players wherein the at least one server is in communication with the plurality of remotely located client devices over a multiplayer video game network, and perform a series of programmatic steps designed to generate electronic user interfaces that present a plurality of scenarios for providing conditional access to the virtual gaming item to a second player of the video game, the method comprising:
within the at least one server, generating data indicative of at least one graphical user interface associated with the video game, wherein the graphical user interfaces is configured to:
prompt at least the first player to provide, to the second player, conditional access to at least the virtual gaming item that is allocated to the first player;
receive from the first player a consent to provide conditional access to the virtual gaming item to the second player; and
prompt the first player to input one or more attributes of the virtual gaming item, wherein the one or more attributes define one or more conditions for accessing the virtual gaming item by the second player and wherein the one or more attributes are at least indicative of one or more predefined periods of time for which the virtual gaming item is conditionally accessible;
within the at least one server, receiving from each of the plurality of client devices data generated by an execution of the video game;
within the at least one server monitoring the received data to determine if the one or more conditions input by the first player for accessing the virtual gaming item by the second player are met by the second player;
within the at least one server, based on data generated by the execution of the video game and representative of the one or more conditions being met by the second player, at least temporarily providing access to the virtual gaming item to the second player within the video game and at least temporarily denying access to virtual gaming item to the first player within the video game, while the virtual gaming item remains in an inventory associated with the first player and a data structure associated with the first player is modified to reflect the virtual gaming item's inaccessibility to the first player, wherein the providing at least temporary access to the virtual gaming item to the second player is published to a ledger using a blockchain and wherein access to the virtual gaming item to the second player is defined by the one or more conditions for accessibility input by the first player; and
within the at least one server, after the one or more predefined periods of time elapses, providing access to the virtual gaming item to the first player within the video game and denying access to the second player within the video game.

2. The method of claim 1, further comprising notifying the first player that the virtual item is being made accessible to the second player for the one or more predefined periods of time.

3. The method of claim 1, further comprising modifying at least one data structure associated with each of the second player and the virtual gaming item to record said conditional accessibility to the virtual gaming item and a first time.

4. The method of claim 3, further comprising determining if the one or more predefined periods of time has elapsed by acquiring a current time, determining a difference between the current time and the first time, and terminating conditional accessibility to the virtual gaming item for the second player if the difference is equal to or greater than the one or more predefined periods of time.

5. The method of claim 4, further comprising modifying the data structure associated with the first player and the at least one data structure associated with the second player and the virtual gaming item to record the termination of the conditional accessibility to the virtual gaming item.

6. The method of claim 1, further comprising generating a graphical user interface to notify at least the second player that the virtual gaming item is conditionally available upon fulfillment of the one or more conditions input by the first player.

7. The method of claim 1, wherein the one or more attributes further comprises at least one of a color of the conditionally accessible virtual video game items or a descriptor of the conditionally accessible virtual video game items.

8. The method of claim 1, wherein the one or more conditions input by the first player comprises a transfer of a predefined amount of virtual value to the first player by the second player.

9. The method of claim 1, wherein the one or more conditions input by the first player comprises reaching a predefined gaming level by the second player.

10. The method of claim 1, further comprising determining if a predefined percentage of a total number of the conditionally accessible virtual gaming items in the video game has been obtained by a total player population playing the video game before prompting at least the first player to provide conditional access to at least the virtual gaming item that is allocated to the first player.

11. A computer readable non-transitory medium comprising a plurality of executable programmatic instructions and stored on at least one server of a computer system configured to host a plurality of concurrently executing different instances of video game applications, host a plurality of client devices associated with remotely located players wherein the at least one server is in communication with the plurality of remotely located client devices over a multiplayer video game network, and perform the plurality of executable programmatic instructions, wherein, when said plurality of executable programmatic instructions are executed by a processor of the at least one server, the computer system is configured to generate electronic user interfaces that present a plurality of scenarios for providing conditional access to a virtual gaming item that is allocated to a first player of a video game hosted by the computer system to a second player of the video game, and wherein, when said plurality of executable programmatic instructions are executed by the processor, the computer system:

within the at least one server generates data indicative of at least one graphical user interfaces, wherein the at least one graphical user interfaces is configured to:
prompt at least the first player to provide, to the second player, conditional access to at least the virtual gaming item that is allocated to the first player;
receive from the first player a consent to provide conditional access to the virtual gaming item to the second player; and
prompt the first player to input one or more attributes of the virtual gaming item, wherein the one or more attributes define one or more conditions for accessing the virtual gaming item by the second player and wherein the one or more attributes are at least indicative of one or more predefined periods of time for which the virtual gaming item is conditionally accessible;

within the at least one server, receive from each of the plurality of client devices data generated by an execution of the video game;

within the at least one server, monitor the received data to determine if the one or more conditions input by the first player for accessing the virtual gaming item input by the first player is met by the second player;

within the at least one server based on data generated by the execution of the video game and representative of the one or more conditions being met by the second player, at least temporarily provide access to the virtual gaming item to the second player within the video game and at least temporarily deny access to virtual gaming item to the first player within the video game, while the virtual gaming item remains in an inventory associated with the first player and a data structure associated with the first player is modified to reflect the virtual gaming item's inaccessibility to the first player, wherein the providing at least temporary access to the virtual gaming item to the second player is recorded in a blockchain and, wherein access to the virtual gaming item to the second player is defined by the one or more conditions for accessibility input by the first player; and within the at least one server after the one or more predefined periods of time elapses, provide access to the virtual gaming item to the first player within the video game and deny access to the second player within the video game.

12. The computer readable non-transitory medium of claim 11, wherein, when said plurality of executable programmatic instructions are executed by a processor, the video game further notifies the first player that the virtual gaming item is being made accessible to the second player for the one or more predefined periods of time.

13. The computer readable non-transitory medium of claim 11, wherein, when said plurality of executable programmatic instructions are executed by a processor, the video game further modifies at least one data structure associated with the second player and the virtual gaming item to record said conditional accessibility to the virtual gaming item and a first time.

14. The computer readable non-transitory medium of claim 13, wherein, when said plurality of executable programmatic instructions are executed by a processor, the video game further determines if the one or more predefined periods of time has elapsed by acquiring a current time, determining a difference between the current time and the first time, and terminating conditional accessibility to the virtual gaming item for the second player if the difference is equal to or greater than the one or more predefined periods of time.

15. The computer readable non-transitory medium of claim 14, wherein, when said plurality of executable programmatic instructions are executed by a processor, the video game further modifies the data structure associated with the first player and the at least one data structure associated with the second player and the virtual gaming item to record the termination of the conditional accessibility to the virtual gaming item.

16. The computer readable non-transitory medium of claim 11, wherein, when said plurality of executable programmatic instructions are executed by a processor, the video game further generates a graphical user interface to notify at least the second player that the virtual gaming item is conditionally available upon fulfillment of the one or more predefined conditions input by the first player.

17. The computer readable non-transitory medium of claim 11, wherein the one or more attributes further comprises at least one of a color of the conditionally accessible virtual gaming item or a descriptor of the conditionally accessible virtual gaming item.

18. The computer readable non-transitory medium of claim 11, wherein the one or more conditions input by the first player comprises a transfer of a predefined amount of virtual value to the first player by the second player.

19. The computer readable non-transitory medium of claim 11, wherein the one or more conditions input by the first player comprises reaching a predefined gaming level by the second player.

20. The computer readable non-transitory medium of claim 11, wherein, when said plurality of executable programmatic instructions are executed by a processor, the video game further determines if a predefined percentage of a total number of the conditionally accessible virtual gaming items in the video game has been obtained by a total player population playing the video game before prompting at least the first player to provide conditional access to at least the virtual gaming item that is allocated to the first player.

* * * * *